US012061753B2

(12) United States Patent
Gwee et al.

(10) Patent No.: US 12,061,753 B2
(45) Date of Patent: Aug. 13, 2024

(54) INPUT DEVICE AND SWITCH ASSEMBLY THEREOF

(71) Applicant: RAZER (ASIA-PACIFIC) PTE. LTD., Singapore (SG)

(72) Inventors: Chang Sern Gwee, Singapore (SG); Wooi Liang Chin, Singapore (SG); Jian Yao Lien, Singapore (SG); Farrukh Raza Rizvi, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 18/254,227

(22) PCT Filed: Dec. 30, 2020

(86) PCT No.: PCT/SG2020/050797
§ 371 (c)(1),
(2) Date: May 24, 2023

(87) PCT Pub. No.: WO2022/146228
PCT Pub. Date: Jul. 7, 2022

(65) Prior Publication Data
US 2024/0004484 A1    Jan. 4, 2024

(51) Int. Cl.
*G06F 3/0354*   (2013.01)
*H01H 21/22*    (2006.01)

(52) U.S. Cl.
CPC ......... *G06F 3/03543* (2013.01); *H01H 21/22* (2013.01)

(58) Field of Classification Search
CPC .............................. G06F 3/03543; H01H 21/22
See application file for complete search history.

(56) References Cited

U.S. PATENT DOCUMENTS 10,025,397 B1 *   7/2018   Lai ........................... H01H 9/08
10,191,567 B2     1/2019   Hong
(Continued)

FOREIGN PATENT DOCUMENTS

CN    202948414 U    5/2013
CN    102298451 B    8/2013
(Continued)

OTHER PUBLICATIONS

International Patent Application No. PCT/SG2020/050797; International Search Report and Written Opinion mailed Sep. 24, 2021; 9 pgs.
(Continued)

*Primary Examiner* — David Tung
(74) *Attorney, Agent, or Firm* — Polsinelli PC

(57) ABSTRACT

An input device including a switch connector having a plurality of electrical terminals fixedly mounted to a circuit board. The input device including a switch assembly magnetically coupled to the switch connector in a removable manner. The switch assembly including a switch adapter having a plurality of contact elements in engagement with the plurality of electrical terminals of the switch connector, and a switch fitted to the switch adapter with a plurality of leads of the switch electrically connected to the plurality of contact elements of the switch adapter. The switch adapter being between the switch connector and the switch. The input device including a magnetic catch arrangement having a first catch unit at the circuit board and a second catch unit at the switch adapter which coact with each other to magnetically couple the switch assembly to the switch connector. A corresponding switch assembly thereof and a computer mouse.

15 Claims, 12 Drawing Sheets

(56) References Cited

U.S. PATENT DOCUMENTS

| | | | |
|---|---|---|---|
| 10,340,099 B2 | 7/2019 | Chen | |
| 11,144,134 B1 * | 10/2021 | Liao | G06F 3/03543 |
| 2012/0098748 A1 | 4/2012 | Lin | |
| 2015/0109208 A1 * | 4/2015 | Wang | G06F 3/03543 |
| | | | 345/163 |
| 2018/0113518 A1 | 4/2018 | Chen | |
| 2018/0210564 A1 * | 7/2018 | Chen | G06F 3/03543 |
| 2018/0240620 A1 * | 8/2018 | Chen | H01H 13/14 |
| 2018/0307328 A1 | 10/2018 | O'mahony et al. | |
| 2021/0090825 A1 * | 3/2021 | Fujino | H01H 13/14 |

FOREIGN PATENT DOCUMENTS

| | | |
|---|---|---|
| CN | 203786681 U | 8/2014 |
| CN | 107132937 A | 9/2017 |
| CN | 206470713 U | 9/2017 |
| CN | 107977091 A | 5/2018 |
| TW | I637291 B | 10/2018 |
| WO | WO 2019-004927 A1 | 1/2019 |

OTHER PUBLICATIONS

ROG Gladius II (https://www.asus.com/in/ROG-Republic-Of-Gamers/ROGGladius-II/) (12 pages).

* cited by examiner

INPUT DEVICE AND SWITCH ASSEMBLY THEREOF

CROSS-REFERENCE TO RELATED APPLICATIONS

This application is a national stage application (under 35 U.S.C. § 371) of International Patent Application No. PCT/SG2020/050797, filed 30 Dec. 2020, the entire content of which is incorporated herein by reference for all purposes.

TECHNICAL FIELD

Various embodiments generally relate to an input device and a switch assembly of the input device. In particular, various embodiments generally related to an input device, e.g. a computer mouse, having a removable switch assembly for swapping or interchanging between different switch assemblies. Various embodiments also relate to the removable switch assembly thereof.

BACKGROUND

A user generally chooses a computer mouse based on usage requirements such as mouse click feel of the mouse button, durability of the mouse, battery life of the mouse, etc. However, these usage requirements are typically different for different usage scenarios and/or computer applications. Accordingly, to meet the different usage requirements, the user may have to own multiple computer mouse that satisfy the different usage requirements. For example, when using the computer mouse for gaming applications, the user may prefer a computer mouse having mouse buttons with a mouse switch that provides more tactile click feel; when using the computer mouse in an office work environment, the user may prefer a computer mouse having a mouse button with a mouse switch that provides a more silent click feel; when using the computer mouse during travels or outside of the usual home/office environment, the user may prefer a computer mouse that uses less power such that the computer mouse has a longer battery life; or when using the computer mouse at home, the user may prefer a computer mouse that is more durable such that the mouse has a longer life span.

Accordingly, there is a need to provide an input device or a computer mouse that provides a simpler and more versatile solution.

SUMMARY

According to various embodiments, there is provided an input device. The input device may include a circuit board. The input device may include a switch connector fixedly mounted to the circuit board. The switch connector may have a plurality of electrical terminals. The input device may include a switch assembly magnetically coupled to the switch connector in a removable manner. The switch assembly may include a switch adapter to interface with the switch connector. The switch adapter may include a plurality of contact elements in engagement with the plurality of electrical terminals of the switch connector. The switch adapter may include an arrangement of electrical elements connected to the plurality of contact elements of the switch adapter. The switch assembly may include a switch fitted to the switch adapter with a plurality of leads of the switch engaged to the arrangement of electrical elements so as to electrically connect the plurality of leads of the switch to the plurality of contact elements of the switch adapter. The switch assembly may be magnetically coupled to the switch connector with the switch adapter between the switch connector and the switch. The input device may include a magnetic catch arrangement to magnetically couple the switch assembly to the switch connector. The magnetic catch arrangement may include a first catch unit coupled to the circuit board and a second catch unit coupled to the switch adapter. The first catch unit and the second catch unit may include a pair of coacting magnet elements or a coacting pair of a magnetic metal element and a magnet element such that the first catch unit and the second catch unit may coact with each other to magnetically couple the switch assembly and the switch connector.

According to various embodiments, there is provided a switch assembly for magnetically coupling to a switch connector fixedly mounted to a circuit board of an input device. The switch assembly may include a switch adapter to interface with the switch connector of the circuit board. The switch adapter may include a plurality of contact elements on a first side of the switch adapter for engaging with a plurality of electrical terminals of the switch connector of the circuit board. The switch adapter may include an arrangement of electrical elements connected to the plurality of contact elements of the switch adapter. The switch assembly may include a switch fitted to the switch adapter with a plurality of leads of the switch engaged to the arrangement of electrical elements so as to electrically connect the plurality of leads of the switch to the plurality of contact elements of the switch adapter. The switch may be fitted to the switch adapter on a second side of the switch adapter opposite the first side of the switch adapter having the plurality of contact elements. The switch assembly may include a catch unit coupled to the switch adapter. The catch unit may include a magnet element or a magnetic metal element to coact with a corresponding catch unit of the circuit board so as to magnetically couple the switch assembly to the switch connector via the switch adapter.

According to various embodiments, there is provided a computer mouse. The computer mouse may include a circuit board. The computer mouse may include a switch connector fixedly mounted to the circuit board. The switch connector may have a plurality of electrical terminals. The computer mouse may include a mouse switch assembly magnetically coupled to the switch connector in a removable manner. The mouse switch assembly may have a plurality of contact elements in engagement with the plurality of electrical terminals of the switch connector. The computer mouse may include a magnetic catch arrangement to magnetically couple the mouse switch assembly to the switch connector. The magnetic catch arrangement may include a first catch unit coupled to the circuit board and a second catch unit coupled to the mouse switch assembly. The first catch unit and the second catch unit may include a pair of coacting magnet elements or a coacting pair of a magnetic metal element and a magnet element such that the first catch unit and the second catch unit may coact with each other to magnetically couple the mouse switch assembly and the switch connector.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
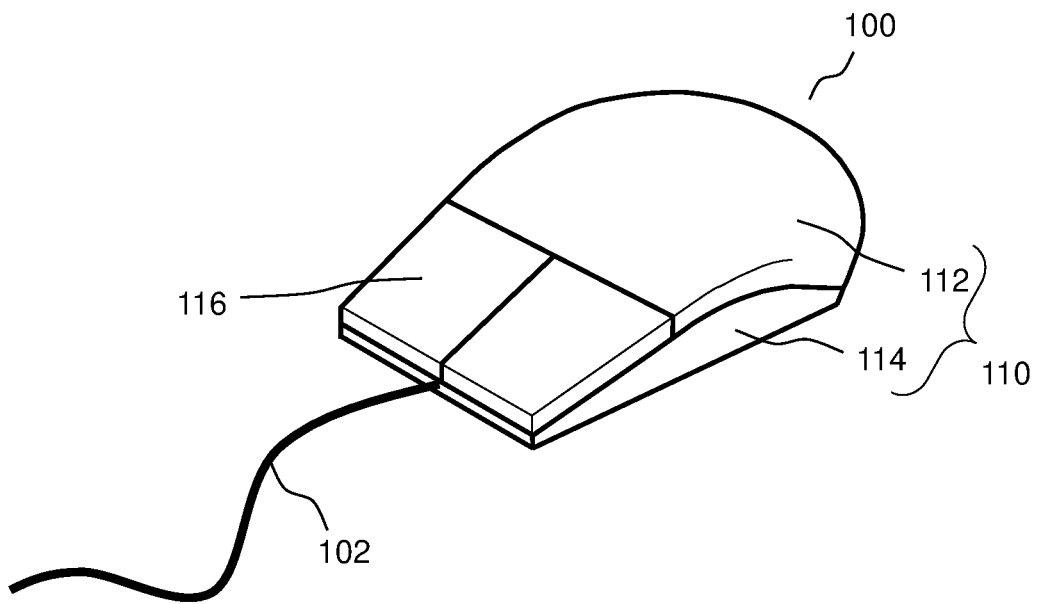
FIG. 1A shows a schematic assembled view of a computer mouse, as an example of the input device, according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to an input device and a switch assembly of the input device. In particular, various embodiments generally related to an input device, e.g. a computer mouse, having a removable switch assembly for swapping or interchanging. Various embodiments also relate to the removable switch assembly thereof. According to various embodiments, the input device may include a computer mouse, a touchpad, a trackball, a joy stick, a controller, a game pad, a key board or any other suitable devices having at least one button. According to various embodiments, the input device may include the removable switch assembly for the at least one button so as to swap or interchange the removable switch assembly with one that is configured with the desired tactile click feel for the at least one button, as well as the durability and the battery usage by the switch assembly so as to customize the input device to match or satisfy the user's requirement based on the computer application and usage scenarios. Accordingly, with the switch assembly being removable from the input device, the user may swap or interchange between different switch assembly of different configurations for the at least one button depending on the desired tactile click feel and usage requirements. Hence, the user may be able to desired tactile click feel as well as the characteristics of the input device to suit various usage scenario without having to own multiple input devices.

According to various embodiments, the input device may include a switch connector and the removable switch assembly may be magnetically coupled to the switch connector in a removable manner such that the switch assembly may be easily swappable and interchangeable. According to various embodiments, with the switch connector and the removable switch assembly being magnetically couplable to each other may provide a simple, fuss-free and versatile solution for the user to swap or interchange the switch assembly according to the user desired tactile click feel and characteristic of the input device.

The following examples pertain to various embodiments.

Example 1 is an input device including:
  a circuit board;
  a switch connector fixedly mounted to the circuit board, the switch connector having a plurality of electrical terminals; and
  a switch assembly magnetically coupled to the switch connector in a removable manner, the switch assembly comprising
    a switch adapter to interface with the switch connector, the switch adapter having
      a plurality of contact elements in engagement with the plurality of electrical terminals of the switch connector, and
      an arrangement of electrical elements connected to the plurality of contact elements of the switch adapter, and
    a switch fitted to the switch adapter with a plurality of leads of the switch engaged to the arrangement of electrical elements so as to electrically connect the plurality of leads of the switch to the plurality of contact elements of the switch adapter, wherein the switch assembly is magnetically coupled to the switch connector with the switch adapter between the switch connector and the switch; and a magnetic catch arrangement to magnetically couple the switch assembly to the switch connector, the magnetic catch arrangement comprises a first catch unit coupled to the circuit board and a second catch unit coupled to the switch adapter, wherein the first catch unit and the second catch unit comprises a pair of coacting magnet elements or a coacting pair of a magnetic metal element and a magnet element such that the first catch unit and the second catch unit coact with each other to magnetically couple the switch assembly and the switch connector.

In Example 2, the subject matter of Example 1 may optionally include that each of the plurality of electrical terminals of the switch connector may include a pogo pin or a spring-loaded pin.

In Example 3, the subject matter of Example 1 or 2 may optionally include that the switch may include a mechanical switch, an optical switch, a magnetic switch, a hall effect switch, a membrane switch, a pressure sensitive switch, or a piezo switch.

In Example 4, the subject matter of Example 3, may optionally include that the plurality of electrical terminals of the switch connector may be arranged in a manner such that the switch assembly is interchangeable between a first switch assembly having the mechanical switch and a second switch assembly having the optical switch.

In Example 5, the subject matter of Example 3 or 4 may optionally include that, when the switch is a mechanical switch, the arrangement of electrical elements of the switch adapter may include spaced apart conductive stripes extending within the switch adapter in a perpendicular direction from the switch connector to the mechanical switch.

In Example 6, the subject matter of Example 5 may optionally include that each of the plurality of contact elements of the switch adapter may be a first end portion of each of the conductive stripes directed towards the switch connector.

In Example 7, the subject matter of Example 6 may optionally include that each of the conductive strips may be bent at a second end portion thereof so as to engage with a corresponding lead of the plurality of leads of the mechanical switch.

In Example 8, the subject matter of any one of Examples 5 to 7 may optionally include that the switch adapter may include an insulation shim plate with a plurality of holes, the insulation shim plate being on a side of the switch adapter opposite the plurality of contact elements of the switch adapter, wherein the mechanical switch is fitted to the switch adapter in a manners so as to be abutting the insulation shim plate and with the plurality of leads of the mechanical switch respectively inserted through the plurality of holes of the insulation shim plate to respectively engage with the conductive stripes.

In Example 9, the subject matter of Example 3 or 4 may optionally include that, when the switch is an optical switch, the arrangement of electrical elements of the switch adapter may include an intervening circuitry disposed in the switch adapter.

In Example 10, the subject matter of Example 9 may optionally include that the intervening circuitry may include the plurality of contact elements of the switch adapter and one or more connection points to connect to the optical switch.

In Example 11, the subject matter of Example 10 may optionally include that the intervening circuitry may include a printed circuit board assembly having a first printed circuit board and a second printed circuit board in a dual layer arrangement and interconnected to each other, wherein the first printed circuit board has the plurality of contact elements and the second printed circuit board has the one or more connection points, wherein the first printed circuit board and the second printed circuit board may be arranged in a manner such that the plurality of contact elements and the one or more connection points are directed away from each other.

In Example 12, the subject matter of Example 11 may optionally include that the switch adapter may include one or more plastic pins to hold apart the first printed circuit board and the second printed circuit board.

In Example 13, the subject matter of Example 11 or 12 may optionally include that the switch assembly may be magnetically coupled to the switch connector with the plurality of contact elements of the first printed circuit board of the switch adapter in contact with the plurality of electrical terminals of the switch connector, and the optical switch abutting the second printed circuit board of the switch adapter.

In Example 14, the subject matter of any one of Examples 1 to 13 may optionally include that the first catch unit may include one or more catch elements and the second catch unit may include one or more corresponding catch elements.

In Example 15, the subject matter of Example 14 may optionally include that the first catch unit may include one elongated catch element coupled to the circuit board and the second catch unit may include one corresponding elongated catch element coupled to the switch adapter, wherein the elongated catch element of the first catch unit of the circuit board may be aligned to the corresponding elongated catch element of the second catch unit of the switch adapter in a manner so as to align the plurality of contact elements of the switch adapter to the plurality of electrical terminals of the switch connector when the elongated catch element of the circuit board and the corresponding elongated catch element of the switch adapter coact to magnetically couples the switch adapter and the switch connector.

In Example 16, the subject matter of Example 14 may optionally include that the first catch unit may include two or more catch elements coupled to the circuit board and the second catch unit may include two or more corresponding catch elements coupled to the switch adapter, wherein the two or more catch elements of the first catch unit of the circuit board may be lined with respect to the plurality of electrical terminals of the switch connector and the two or more corresponding catch elements of the second catch unit of the switch adapter may be aligned to the plurality of contact elements of the switch adapter in a manner so as to align the plurality of contact elements of the switch adapter to the plurality of electrical terminals of the switch connector when the two or more catch elements of the first catch unit of the circuit board and the two or more corresponding catch elements of the second catch unit of the switch adapter coact to magnetically couples the switch adapter and the switch connector.

In Example 17, the subject matter of any one of Examples 1 to 16 may optionally include that the switch adapter of the switch assembly may include alignment structures for aligning the switch adapter of the switch assembly to the switch connector during assembling.

In Example 18, the subject matter of Example 17 may optionally include that the alignment structures may include two or more alignment pins for aligning with corresponding recesses or enclosure wall structures for surrounding the switch connector.

In Example 19, the subject matter of any one of Examples 1 to 18 may optionally include that the circuit board may have a planar surface, wherein the plurality of electrical terminals of the switch connection may be directed perpendicularly away from the planar surface of the circuit board, wherein the switch assembly may be magnetically coupled to the switch connector in a manner so as to be removably stacked onto the switch connector in a direction perpendicular to the planar surface of the circuit board, wherein the switch adapter of the switch assembly may be between the switch connector and the switch of the switch assembly along the direction perpendicular to the planar surface of the circuit board.

Example 20 is a switch assembly for magnetically coupling to a switch connector fixedly mounted to a circuit board of an input device, the switch assembly including:
- a switch adapter to interface with the switch connector of the circuit board, the switch adapter having
  - a plurality of contact elements on a first side of the switch adapter for engaging with a plurality of electrical terminals of the switch connector of the circuit board, and
  - an arrangement of electrical elements connected to the plurality of contact elements of the switch adapter;
- a switch fitted to the switch adapter with a plurality of leads of the switch engaged to the arrangement of electrical elements so as to electrically connect the plurality of leads of the switch to the plurality of contact elements of the switch adapter, wherein the switch is fitted to the switch adapter on a second side of the switch adapter opposite the first side of the switch adapter having the plurality of contact elements; and
- a catch unit coupled to the switch adapter, the catch unit including a magnet element or a magnetic metal element to coact with a corresponding catch unit of the circuit board so as to magnetically couple the switch assembly to the switch connector via the switch adapter.

In Example 21, the subject matter of Example 20 may optionally include that the switch may include an optical switch, a mechanical switch, a magnetic switch, a hall effect switch, a membrane switch, a pressure sensitive switch, or a piezo switch.

In Example 22, the subject matter of Example 21 may optionally include that, when the switch is a mechanical switch, the arrangement of electrical elements of the switch adapter may include spaced apart conductive stripes extending within the switch adapter from the first side of the switch adapter towards the second side of the switch adapter.

In Example 23, the subject matter of Example 22 may optionally include that each of the plurality of contact elements of the switch adapter may be a first end portion of each of the conductive stripe at the first side of the switch adapter.

In Example 24, the subject matter of Example 23 may optionally include that each of the conductive strips may be bent at a second end portion thereof so as to engage with a corresponding lead of the plurality of leads of the mechanical switch.

In Example 25, the subject matter of any one of Examples 22 to 24 may optionally include that the switch adapter may include an insulation shim plate with a plurality of holes, the insulation shim plate being on the second side of the switch adapter, wherein the mechanical switch is fitted to the switch adapter in a manners so as to be abutting the insulation shim plate and with the plurality of leads of the mechanical switch respectively inserted through the plurality of holes of the insulation shim plate to respectively engage with the conductive stripes.

In Example 26, the subject matter of Example 21 may optionally include that, when the switch is an optical switch, the arrangement of electrical elements of the switch adapter may include an intervening circuitry disposed in the switch adapter.

In Example 27, the subject matter of Example 26 may optionally include that the intervening circuitry may include the plurality of contact elements of the switch adapter and one or more connection points to connect to the optical switch.

In Example 28, the subject matter of Example 27 may optionally include that the intervening circuitry may include a printed circuit board assembly having a first printed circuit board and a second printed circuit board in a dual layer arrangement and interconnected to each other, wherein the first printed circuit board has the plurality of contact elements and the second circuit board has the one or more connection points, wherein the first printed circuit board is at the first side of the switch adapter and the second printed circuit board is at the second side of the switch adapter.

In Example 29, the subject matter of Example 28 may optionally include that the switch adapter may include plastic pins to hold apart the first printed circuit board and the second printed circuit board.

In Example 30, the subject matter of Example 29 may optionally include that the optical switch may be fitted to the switch adapter with the optical switch abutting the second printed circuit board of the switch adapter.

In Example 31, the subject matter of any one of Examples 20 to 30 may optionally include that the catch unit may include one elongated catch element coupled to the switch adapter, the one elongated catch element being aligned to the plurality of contact elements of the switch adapter in a manner so as to coact with a corresponding elongated catch element of the circuit board for magnetically coupling the switch adapter to the switch connector of the circuit board such that the plurality of contact elements of the switch adapter engages with the plurality of electrical terminals of the switch connector.

In Example 32, the subject matter of any one of Examples 20 to 30 may optionally include that the catch unit may include two or more catch elements coupled to the switch adapter, the two or more catch elements being aligned to the plurality of contact elements of the switch adapter in a manner so as to coact with two or more corresponding catch elements of the circuit board for magnetically coupling the switch adapter to the switch connector of the circuit board such that the plurality of contact elements of the switch adapter engages with the plurality of electrical terminals of the switch connector.

In Example 33, the subject matter of any one of Examples 20 to 32 may optionally include that the switch adapter of the switch assembly may include alignment structures at the first side of the switch adapter for aligning the switch adapter of the switch assembly to the switch connector of the circuit board during assembling.

In Example 34, the subject matter of Example 33 may optionally include that the alignment structures may include two or more alignment pins for aligning with corresponding recess in the switch connector or enclosure wall structures for surrounding the switch connector.

Example 35 is a computer mouse including:
a circuit board;
a switch connector fixedly mounted to the circuit board, the switch connector having a plurality of electrical terminals;
a mouse switch assembly magnetically coupled to the switch connector in a removable manner, the mouse switch assembly having a plurality of contact elements in engagement with the plurality of electrical terminals of the switch connector; and
a magnetic catch arrangement to magnetically couple the mouse switch assembly to the switch connector, the magnetic catch arrangement comprises a first catch unit coupled to the circuit board and a second catch unit coupled to the mouse switch assembly, wherein the first catch unit and the second catch unit comprises a pair of coacting magnet elements or a coacting pair of a magnetic metal element and a magnet element such that the first catch unit and the second catch unit coact with each other to magnetically couple the mouse switch assembly and the switch connector.

In Example 36, the subject matter of Example 35 may optionally include that each of the plurality of electrical terminals of the switch connector may include a pogo pin or a spring-loaded pin.

In Example 37, the subject matter of Example 35 or 36 may optionally include that the mouse switch assembly may include an optical switch, a mechanical switch, a magnetic switch, a hall effect switch, a membrane switch, a pressure sensitive switch, or a piezo switch.

In Example 38, the subject matter of Example 37 may optionally include that the plurality of electrical terminals of the switch connector may be arranged in a manner such that the mouse switch assembly is interchangeable between a first mouse switch assembly having the optical switch and a second mouse switch assembly having the mechanical switch.

In Example 39, the subject matter of any one of Examples 35 to 38 may optionally include that the first catch unit may include one or more catch elements and the second catch unit may include one or more corresponding catch elements.

In Example 40, the subject matter of Example 39 may optionally include that the first catch unit may include one elongated catch element coupled to the circuit board and the second catch unit include one corresponding elongated catch element coupled to the mouse switch assembly, wherein the elongated catch element of the circuit board may be aligned to the corresponding elongated catch element of the mouse switch assembly in a manner so as to align the plurality of contact elements of the mouse switch assembly to the plurality of electrical terminals of the switch connector when the elongated catch element of the circuit board and the corresponding elongated catch element of the mouse switch assembly coact to magnetically couples the switch assembly and the switch connector.

In Example 41, the subject matter of Example 39 may optionally include that the first catch unit may include two or more catch elements coupled to the circuit board and the second catch unit may include two or more corresponding catch elements coupled to the mouse switch assembly, wherein the two or more catch elements of the circuit board may be lined with respect to the plurality of electrical terminals of the switch connector and the two or more corresponding catch elements of the mouse switch assembly may be lined with respect to the plurality of contact elements of the mouse switch assembly in a manner so as to align the plurality of contact elements of the switch assembly to the plurality of electrical terminals of the switch connector when the two or more catch elements of the circuit board and the two or more corresponding catch elements of the switch assembly coact to magnetically couples the switch assembly and the switch connector.

In Example 42, the subject matter of any one of Examples 35 to 41 may optionally include that the mouse switch assembly may include alignment structures for aligning the mouse switch assembly to the switch connector during assembling.

In Example 43, the subject matter of Example 42 may optionally include that the alignment structures may include two or more alignment pins for aligning with corresponding recesses in the switch connector or enclosure wall structures for surrounding the switch connector.

FIG. 1A shows a schematic assembled view of a computer mouse 100, as an example of the input device, according to various embodiments. FIG. 1B shows a schematic exploded view of the computer mouse 100 of FIG. 1A according to various embodiments. As shown, the computer mouse 100 may include a housing 110. The housing 110 may be an exterior casing of the computer mouse 100. Further, the housing 110 may include a cover portion 112 and a base portion 114. The cover portion 112 and the base portion 114 may be two separate parts of the housing 110. The cover portion 112 of the housing 110 may be a top case cover of the exterior casing of the computer mouse 100. The base portion 114 of the housing 110 may be a bottom case cover of the exterior casing of the computer mouse 100. According to various embodiments, when the cover portion 112 and the base portion 114 are assembled together, the housing 110 may define an inner cavity to house or encase internal components 104 of the computer mouse 100.

According to various embodiments, the internal components 104 of the computer mouse 100 may include a circuit board 120. The circuit board 120 may include a printed circuit board, or any other suitable electronic circuit. The circuit board 120 may be connected to a processor-based device, such as a computer or a laptop or a notebook, via a cable 102. According to various embodiments, the internal components 104 of the computer mouse 100 may include a motion detection unit 130. The motion detection unit 130 may include optical sensors, or laser sensors, or track ball mechanism, or any other electronic or mechanical components that may be configured to detect movement of the computer mouse 100. The motion detection unit 130 may further be configured to be in communication with the circuit board 120 such that the detected movement of the computer mouse may be transmitted to the processor-based device, which the computer mouse 100 may be connected to, via the circuit board 120.

According to various embodiments, the cover portion 112 of the housing 110 may include one or more buttons 116. The one or more buttons 116 may be configured to interact with the circuit board 120 of the computer mouse 100 for a user to provide inputs to the processor-based device, which the computer mouse 100 may be connected to, via clicking of the one or more buttons 116 of the computer mouse 100. The one or more buttons 116 may include a click button, or a scroll button, or a push button, or any combination of suitable buttons. The one or more buttons 116 may be located at any desired region of the cover portion 112 as desired.

According to various embodiments, the internal components 104 of the computer mouse 100 may include a switch assembly 140 (or a mouse switch assembly) associated with each of the one or more buttons 116. Accordingly, the internal components 104 of the computer mouse 100 may include one or more switch assemblies 140 corresponding to the one or more buttons 116. According to various embodiments, each of the one or more buttons 116 may respectively interact with the switch assembly 140 for providing an input signal to the circuit board 120 so as to be transmitted to the processor-based device.

According to various embodiments, the circuit board 120 may include a switch connector 122 for each switch assembly 140. Accordingly, the circuit board 120 may include one or more switch connector 122 corresponding to the number of the switch assemblies 140. According to various embodiments, the switch connector 122 may be fixedly mounted to the circuit board 120. Accordingly, the switch connector 122 may be firmly attached or securely fastened or permanently bonded to the circuit board 120. According to various embodiments, each switch assembly 140 may be removably coupled to the corresponding switch connector 122 of the circuit board 120. According to various embodiments, the circuit board 120 may include a planar surface 121. Accordingly, the switch connector 122 may be fixedly mounted to the planar surface 121 of the circuit board 120.

According to various embodiments, the switch assembly 140 may be magnetically coupled to the switch connector 122 of the circuit board 120 in a removable manner. Accordingly, the switch assembly 140 and the switch connector 122 may be held or join or connect together via magnetic attraction or magnetic force. Hence, the switch assembly 140 and the switch connector 122 may be magnetically attracted to each other in a manner so as to bear the switch assembly 140 and the switch connector 122 against each other such that the switch assembly 140 and the switch connector 122 may be kept or maintained engaged to one another. Further, the switch assembly 140 and the switch connector 122 may be decoupled or removed from each other via applying a pulling force to overcome the magnetic attraction or magnetic force so as to pull apart the switch assembly 140 and the switch connector 122. Hence, the switch assembly 140 and the switch connector 122 may be removable from each other via application of the pulling force that is greater than the magnetic force.

According to various embodiments, the base portion 114 of the housing 110 may include a substantially flat section 115. When the computer mouse 100 is placed on a tracking surface, the substantially flat section 115 of the base portion 114 of the housing 110 may be parallel to the tracking surface on which the computer mouse 100 is placed. Accordingly, the computer mouse 100 may be placed with the substantially flat section 115 of the base portion 114 of the housing 110 substantially flat against or substantially parallel to a mouse pad, a table top, or any other suitable tracking surfaces on which the computer mouse may be used. According to various embodiments, the circuit board 120 of the computer mouse 100 may be disposed or positioned or mounted within the housing 110 in a manner so as to be parallel to the substantially flat section 115 of the base portion 114 of the housing 110. Accordingly, the planar surface 121 of the circuit board 120 may be parallel to the substantially flat section 115 of the base portion 114 of the housing 110.

According to various embodiments, the base portion 114 of the housing 110 may include a window 118. The window 118 may be an opening or a transparent portion of the base portion 114. Accordingly, the window 118 may allow the motion detection module 130 to detect relative movement between the computer mouse 100 and the tracking surface on which the computer mouse 100 may be placed and moved.

Figure 1C:
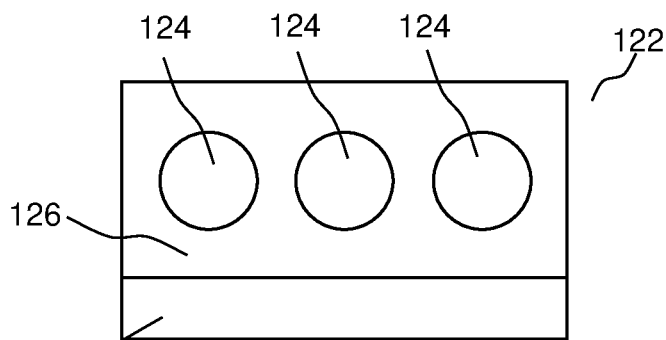
FIG. 1C shows a schematic top view of a switch connector of a circuit board of the computer mouse of FIG. 1A according to various embodiments.
Figure 1D:
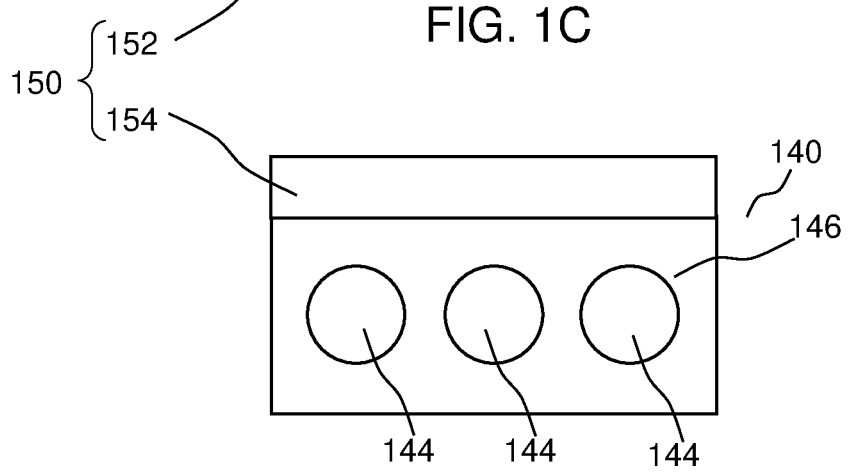
FIG. 1D shows a schematic bottom view of a switch assembly of the computer mouse of FIG. 1A according to various embodiments.
Figure 1B:
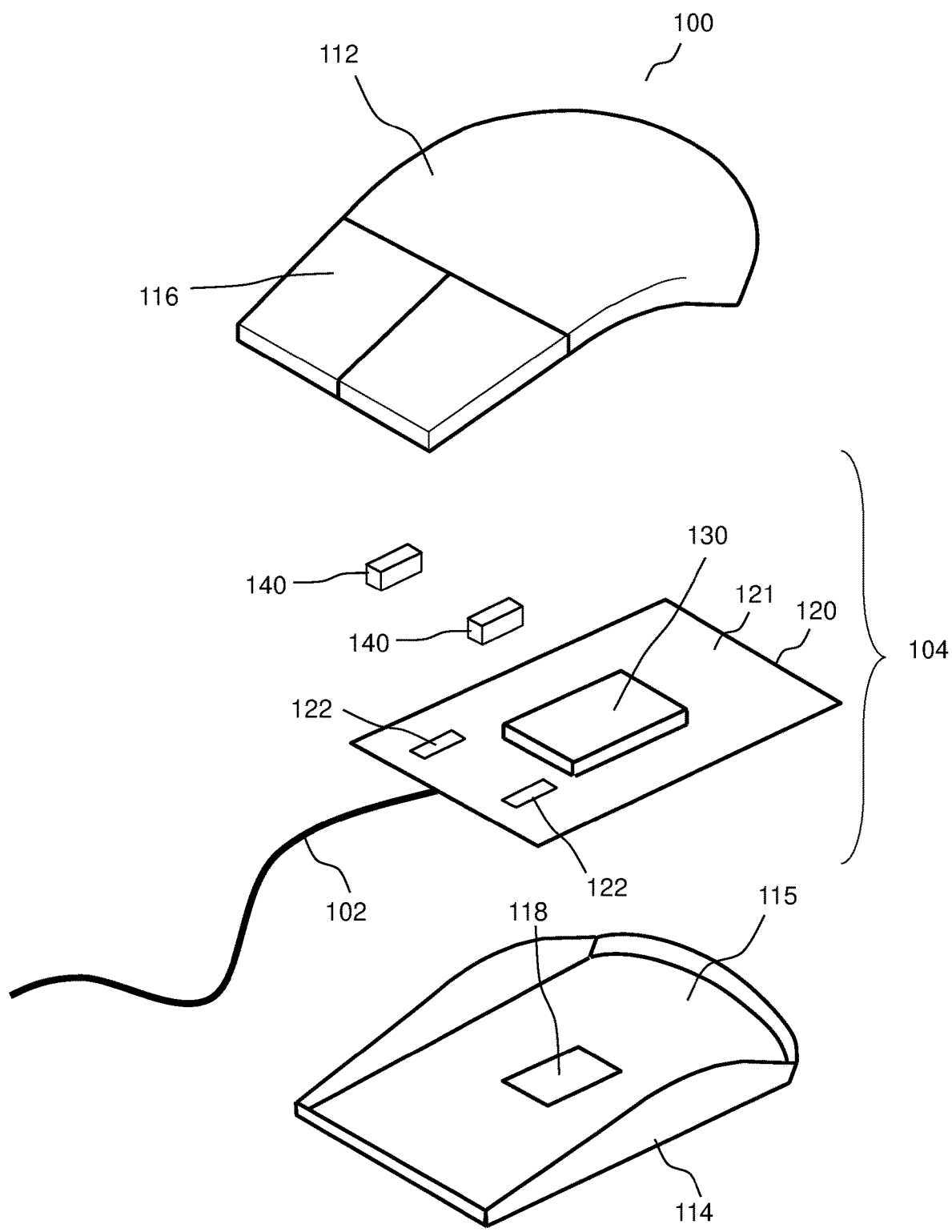
FIG. 1B shows a schematic exploded view of the computer mouse of FIG. 1A according to various embodiments.

FIG. 1C shows a schematic top view of the switch connector 122 of the circuit board 120 of the computer mouse 100 according to various embodiments. FIG. 1D shows a schematic bottom view of the switch assembly 140 of the computer mouse 100 according to various embodiments.

According to various embodiments, the switch connector 122 may include a plurality of electrical terminals 124. The plurality of electrical terminals 124 may serve as endpoints of an electrical network of the circuit board 120. Accordingly, connections may be made to the electrical network of the circuit board 120 via the plurality of electrical terminals 124. According to various embodiments, for example, the plurality of electrical terminals 124 may include, but not limited to, one or a combination of a voltage supply terminal, a voltage reference (or ground) terminal, or a switch status signal terminal. According to various embodiments, the plurality of electrical terminals 124 may serve as points for the switch assembly 140 to establish electrical connections with the circuit board 120. According to various embodiments, the switch status signal terminal may receive binary signals or analogue signals.

According to various embodiments, the plurality of electrical terminals 124 may be disposed or located at a top face 126 of the switch connector 122. The top face 126 of the switch connector 122 may be oriented away or in a direction pointing away from the planar surface 121 of the circuit board 120. Accordingly, the plurality of electrical terminals 124 may be directed perpendicularly away from the planar surface 121 of the circuit board 120. Hence, during installation, the switch assembly 140 may be brought towards the switch connector 122 along a path perpendicular to the planar surface 121 of the circuit board 120 for connecting the switch assembly 140 to the switch connector 120. According to various embodiments, as an example, the plurality of electrical terminals 124 may be lined in a straight row along the top face 126 of the switch connector 122. According to various embodiments, the plurality of electrical terminals 124 may be arranged in any suitable pattern on the top face 126 of the switch connector 122. According to various embodiments, each of the plurality of electrical terminals 124 of the switch connector 122 may include, but not limited to, a pogo pin or a spring-loaded pin or a contact pad or a pin or a plug or a jack or a socket.

According to various embodiments, the switch assembly 140 may include a plurality of contact elements 144. The plurality of contact elements 144 may serve as endpoints at which conductors from the switch assembly 140 comes to an end. Accordingly, the plurality of contact elements 144 may be electrical interfaces of the switch assembly 140 for connecting the switch assembly 140 to the electrical network of the circuit board 120. According to various embodiments, for example, the plurality of contact elements 144 may include, but not limited to, one or a combination of a voltage supply contact, a voltage reference (or ground) contact, or a switch status signal contact. According to various embodiments, the switch status signal contact may pass a binary signal or an analogue signal. According to various embodiments, the plurality of contact elements 144 of the switch assembly 140 may respectively engage or connect or mate or joint to the plurality of electrical terminals 124 of the switch connector 122 for establishing electrical connections with the circuit board 120. According to various embodiments, each of the plurality of contact elements 144 of the switch assembly 140 may be a reciprocal of the corresponding electrical terminals 124 of the switch connector 122. Accordingly, each of the plurality of contact elements 144 of the switch assembly 140 may include, but not limited to, a pogo pin or a spring-loaded pin or a contact pad or a pin or a plug or a jack or a socket.

According to various embodiments, the plurality of contact elements 144 may be disposed or located at a bottom face 146 (or underneath face) of the switch assembly 140. Accordingly, the plurality of contact elements 144 may be directed in a direction projecting outwards from the bottom face 146 of the switch assembly 140. According to various embodiments, the switch assembly 140 may be coupled to the switch connector 122 with the bottom face 146 of the switch assembly 140 and the top face 126 of the switch connector 122 directed towards each other or facing each other or abutting each other. Accordingly, the switch assembly 140 may be coupled to the switch connector 122 in a manner such that the plurality of contact elements 144 of the switch assembly 140 and the plurality of electrical terminals 124 of the switch connector 122 may be directed towards each other for engaging with each other so as to establish electrical connections between the switch assembly 140 and the circuit board 122. According to various embodiments, the plurality of contact elements 144 of the switch assembly 140 may be arranged in a pattern at the bottom face 146 which corresponds to that of the plurality of electrical terminals 124 of the switch connector 122. For example, when the plurality of electrical terminals 124 is lined in a straight row along the top face 126 of the switch connector 122, the plurality of contact elements 144 of the switch assembly 140 may also be lined in a corresponding straight row along the bottom face 144 of the switch assembly 140. In other words, the arrangement of the plurality of contact elements 144 of the switch assembly 140 and the arrangement of the plurality of electrical terminals 124 of the switch connector 122 may be a mirror reflection of each other when facing (or opposing) each other.

According to various embodiments, the internal components 104 of the computer mouse 100 may include a magnetic catch arrangement 150. According to various embodiments, the magnetic catch arrangement 150 may magnetically couple the switch assembly 140 to the switch connector 122. According to various embodiments, the magnetic catch arrangement 150 may include a first catch unit 152 coupled to the circuit board 120. According to various embodiments, the first catch unit 152 may be adjacent or next to or close to or nearby the switch connector 122. Accordingly, the first catch unit 152 and the switch connector 122 may not be necessarily touching each other and may be separated with a small gap or space therebetween. According to various embodiments, the first catch unit 152 may be on the same planar surface 121 of the circuit board 120 as the switch connector 122 or may be on an opposite surface of the circuit board 120.

According to various embodiments, the magnetic catch arrangement 150 may include a second catch unit 154 coupled to the switch assembly 140. According to various embodiments, the second catch unit 154 may be co-located at the bottom face 146 of the switch assembly 140 together with the plurality of contact elements 144 of the switch assembly 140. According to various embodiments, the second catch unit 154 may be adjacent or next to or close to or nearby the plurality of contact elements 144 of the switch assembly 140. Accordingly, the second catch unit 154 and the plurality of contact elements 144 may not be necessarily touching each other and may be separated with a small gap or space therebetween. According to various embodiments, the second catch unit 154 and the plurality of contact elements 144 of the switch assembly 140 may be arranged in a manner so as to correspond with an arrangement of the plurality of electrical terminals 124 of the switch connector 122 and the first catch unit 152 such that the plurality of contact elements 144 of the switch assembly 140 and the plurality of electrical terminals 124 of the switch connector 122 may engage with each other when the second catch unit 154 and the first catch unit 152 coact with or attract each other to magnetically couple the switch assembly 140 and the switch connector 122. Accordingly, second catch unit 154 and the plurality of contact elements 144 of the switch assembly 140 may be arranged to mirror the arrangement of the plurality of electrical terminals 124 of the switch connector 122 and the first catch unit 152.

According to various embodiments, the first catch unit 152 and the second catch unit 154 of the magnetic catch arrangement 150 may include a pair of coacting magnet elements. Accordingly, the first catch unit 152 may include a first magnet element and the second catch unit 154 may include a second magnet element, wherein the first magnet element and the second magnet element may coact to attract each other. For example, when the switch assembly 140 is lined up with the switch connector 122 of the circuit board 120, a side of the first magnet element of the first catch unit 152 and a side of the second magnet element of the second catch unit 154 that are opposing each other may be of opposite poles such that the first magnet element of the first catch unit 152 and the second magnet element of the second catch unit 154 may be pulled towards each other so as to magnetically couple the switch assembly 140 and the switch connector 122.

According to various embodiments, the first catch unit 152 and the second catch unit 154 may include a coacting pair of a magnetic metal element and a magnet element. Accordingly, the first catch unit 152 may include a magnetic metal element and the second catch unit 154 may include a magnet element, or vice versa. Thus, when the when the switch assembly 140 is lined up with the switch connector 122 of the circuit board 120, the magnetic metal element and the magnet element may coact to attract each other. Hence, due to the attraction between the magnetic metal element and the magnet element, the first catch unit 152 and the second catch unit 154 may be pulled towards each other so as to magnetically couple the switch assembly 140 and the switch connector 122.

According to various embodiments, the first catch unit 152 of the magnetic catch arrangement 150 may include one or more catch elements and the second catch unit 154 of the magnetic catch arrangement 150 may include one or more corresponding catch elements. According to various embodiments, the first catch unit 152 of the magnetic catch arrangement 150 may include one or more magnet catch elements and the second catch unit 154 of the magnetic catch arrangement 150 may include one or more corresponding magnet catch elements. According to various embodiments, the first catch unit 152 of the magnetic catch arrangement 150 may include one or more magnetic metal catch elements and the second catch unit 154 of the magnetic catch arrangement 150 may include one or more corresponding magnet catch elements. According to various embodiments, the first catch unit 152 of the magnetic catch arrangement 150 may include one or more magnet catch elements and the second catch unit 154 of the magnetic catch arrangement 150 may include one or more corresponding magnetic metal catch elements.

According to various embodiments, for example as shown in FIG. 1C, the first catch unit 152 of the magnetic catch arrangement 150 may include one elongated catch element coupled to the circuit board 120. According to various embodiments, for example as shown in FIG. 1D, the second catch unit 154 of the magnetic catch arrangement 150 may include one corresponding elongated catch element coupled to the switch assembly 140. According to various embodiments, the one elongated catch element of first catch unit 152 of the circuit board 120 may be aligned to the one corresponding elongated catch element of the second catch unit 154 of the switch assembly 140 in a manner so as to align the plurality of contact elements 144 of the switch assembly 140 to the plurality of electrical terminals 124 of the switch connector 122 when the elongated catch element of first catch unit 152 of the circuit board 120 and the corresponding elongated catch element of the second catch unit 154 of the switch assembly 140 coact to magnetically couples the switch assembly and the switch connector.

According to various embodiments, the one elongated catch element of the first catch unit 152 may be disposed with respect to the plurality of electrical terminals 124 of the switch connector 122 and the corresponding one elongated catch element of the second catch unit 154 may be disposed with respect to the plurality of contact elements 144 of the switch assembly 140 in a manner such that, when the switch assembly 140 is lined up with the switch connector 122 to align the one elongated catch element of the first catch unit 152 and the corresponding one elongated catch element of the second catch unit 154, the plurality of electrical terminals 124 of the switch connector 122 and the plurality of contact elements 144 of the switch assembly 140 may be aligned such that magnetically coupling the switch assembly 140 to the switch connector 122 may engage the plurality of contact elements 144 of the switch assembly 140 and the plurality of electrical terminals 124 of the switch connector 122. According to various embodiments, the one elongated catch element of the first catch unit 152 and the corresponding one elongated catch element of the second catch unit 154 may be respectively disposed or configured such that the one elongated catch element of the first catch unit 152 and the corresponding one elongated catch element of the second catch unit 154 may coact to attract and align to each other so as to align the plurality of electrical terminals 124 of the switch connector 122 and the plurality of contact elements 144 of the switch assembly 140 when magnetically coupling the switch assembly 140 and the switch connector 122.

Figure 3A:
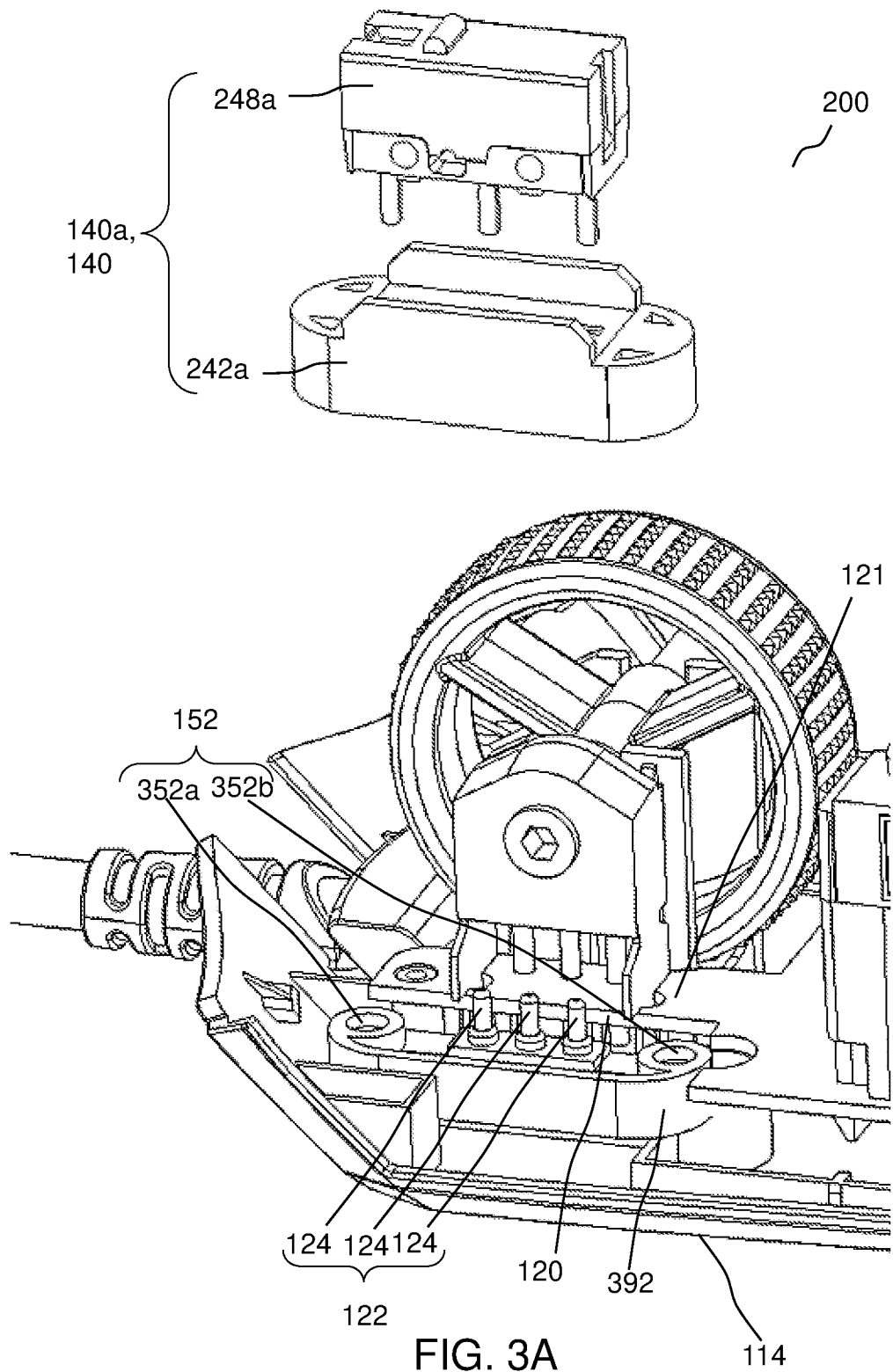
FIG. 3A shows the computer mouse of FIG. 2 with a first switch assembly having a mechanical switch, whereby a section of a circuit board is cut away to show a switch connector with a plurality of electrical terminals, according to various embodiments.
Figure 3C:
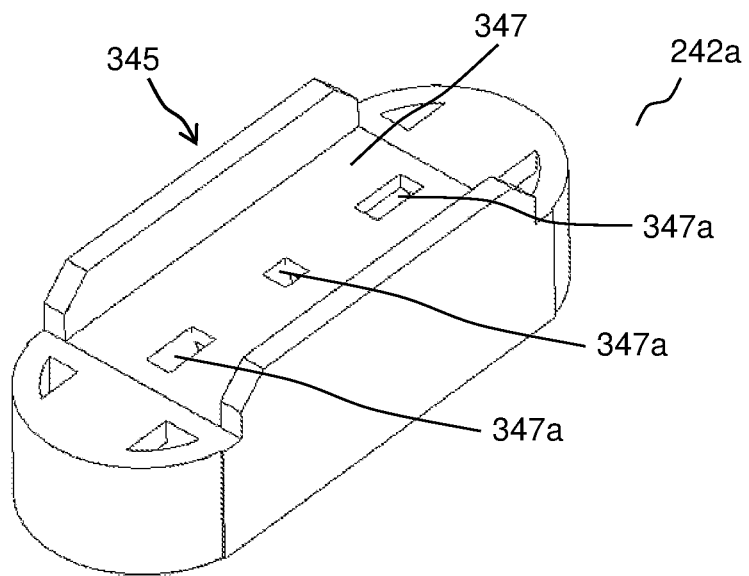
FIG. 3C shows a perspective top view of a first switch adapter of the first switch assembly of FIG. 3B according to various embodiments.
Figure 4A:
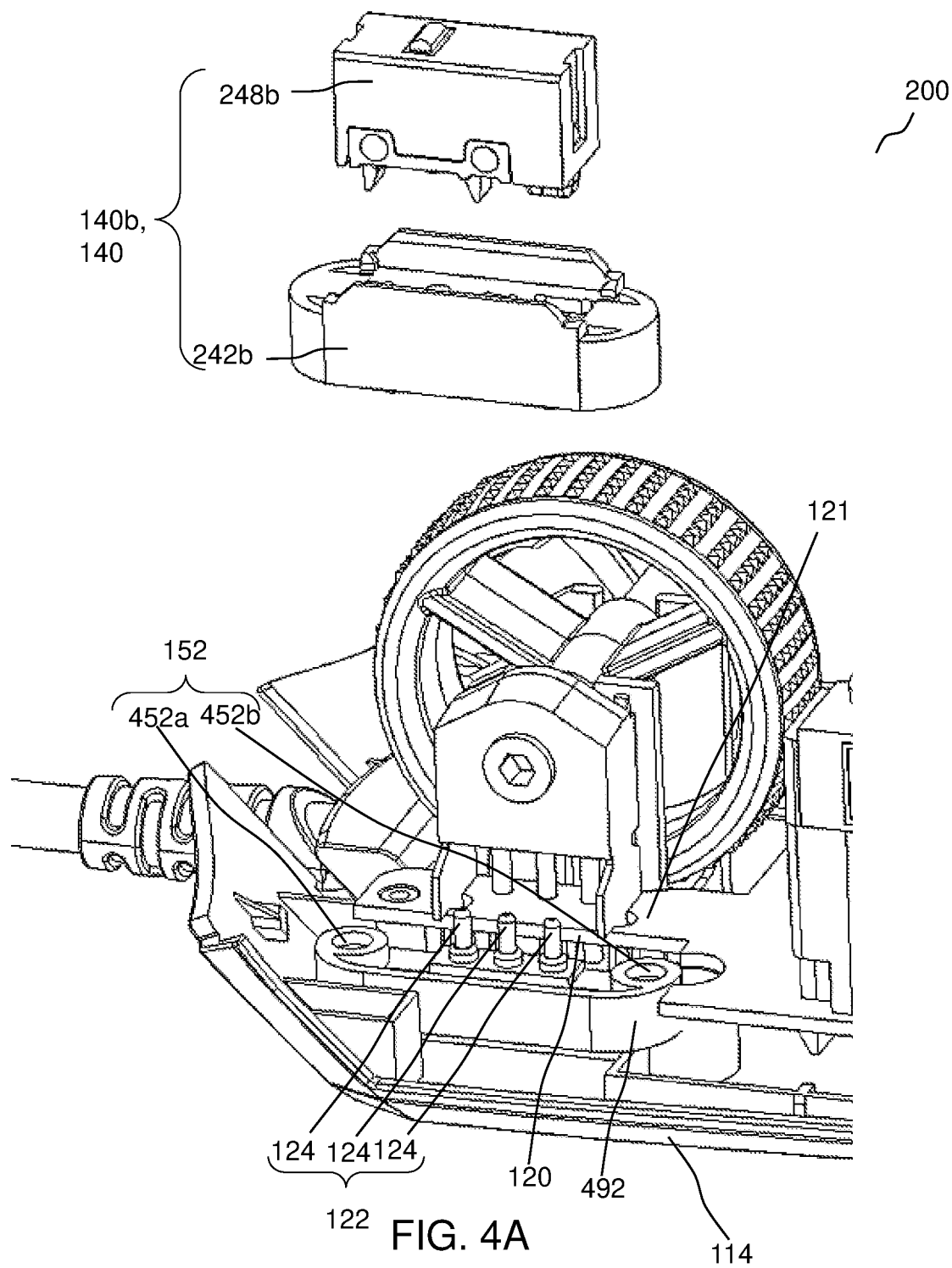
FIG. 4A shows the computer mouse of FIG. 2 with a second switch assembly having an optical switch, whereby a section of a circuit board is cut away to show a switch connector with a plurality of electrical terminals, according to various embodiments.

According to various embodiments, for example as shown in FIG. 3A and FIG. 4A, the first catch unit 152 may include two or more catch elements (see for example catch elements 352a, 352b in FIGS. 3A and 452a, 452b in FIG. 4A) coupled to the circuit board 120 and the second catch unit 154 may include two or more corresponding catch elements (see for example catch elements 354a, 354b in FIGS. 3C and 454a, 454b in FIG. 4C) coupled to the switch assembly 140. According to various embodiments, the two or more catch elements of the first catch unit 152 of the circuit board 120 may be lined with respect to the plurality of electrical terminals 124 of the switch connector 120 and the two or more corresponding catch elements of the second catch unit 154 of the switch assembly 140 may be lined with respect to the plurality of contact elements 144 of the switch assembly 140 in a manner so as to align the plurality of contact elements 144 of the switch assembly 140 to the plurality of electrical terminals 124 of the switch connector 122 when the two or more catch elements of the first catch unit 152 of the circuit board 120 and the two or more corresponding catch elements of the second catch unit 154 of the switch assembly 140 coact to magnetically couples the switch assembly 140 and the switch connector 122.

According to various embodiments, the two or more catch elements of the first catch unit 152 may be disposed with respect to the plurality of electrical terminals 124 of the switch connector 122 and the two or more corresponding catch elements of the second catch unit 154 may be disposed with respect to the plurality of contact elements 144 of the switch assembly 140 in a manner such that, when the switch assembly 140 is lined up with the switch connector 122 to align the two or more catch elements of the first catch unit 152 and the two or more corresponding catch elements of the second catch unit 154, the plurality of electrical terminals 124 of the switch connector 122 and the plurality of contact elements 144 of the switch assembly 140 may be aligned such that magnetically coupling the switch assembly 140 to the switch connector 122 may engage the plurality of contact elements 144 of the switch assembly 140 and the plurality of electrical terminals 124 of the switch connector 122. According to various embodiments, the two or more catch elements of the first catch unit 152 and the two or more corresponding catch elements of the second catch unit 154 may be respectively disposed or configured such that the two or more catch elements of the first catch unit 152 and the two or more corresponding catch elements of the second catch unit 154 may coact to attract and align to each other so as to align the plurality of electrical terminals 124 of the switch connector 122 and the plurality of contact elements 144 of the switch assembly 140 when magnetically coupling the switch assembly 140 and the switch connector 122.

According to various embodiments, the switch assembly 140 may include, but not limited to, an optical switch (see for example 248b in FIG. 4A) or a mechanical switch (see for example 248a in FIG. 3A) or a magnetic switch, or a hall effect switch, or a membrane switch, or a pressure sensitive switch, or a piezo switch. According to various embodiments, the various different types of switches (for example, at least between the optical switch and the mechanical switch) may differ in that they provide different tactile click feel and characteristic for the one or more buttons 116. According to various embodiments, with the switch assembly 140 being magnetically coupled to the switch connector 122 in a removable manner, the switch assembly 140 of the computer mouse 100 may be swappable or interchangeable between, at least, a first switch assembly (see for example 140a in FIG. 3A) including a first type of switch (e.g. the mechanical switch) and a second switch assembly (see for example 140b in FIG. 4A) including a second type of switch (e.g. the optical switch). According to various embodiments, the plurality of electrical terminals 124 of the switch connector 122 may be configured or arranged in a manner such that the switch assembly 140 magnetically coupled to the switch connector 122 may be swapped or interchanged between, at least, the first switch assembly including the first type of switch (e.g. the mechanical switch) and the second switch assembly including the second type of switch (e.g. the optical switch). According to various embodiments, each type of switch may have a plurality of leads (for example, see 349 in FIG. 3B). Depending on the type of switch, the plurality of leads may include, but not limited to, a voltage supply lead, a voltage reference lead, or a switch status signal lead. For example, the switch may include all three leads or may include only the switch status signal lead and either the voltage supply lead or the voltage reference lead. According to various embodiments, the switch status signal lead may transmit a binary signal when the switch is a binary switch or an analogue signal when the switch is an analogue switch to indicate a status of the switch. According to various embodiments, the plurality of leads of the switch of the switch assembly 140 may be in connection with the plurality of contact elements 144 of the switch assembly 140 so as to be connected to the plurality of electrical terminals 124 of the switch connector 122 when the switch assembly 140 is magnetically coupled to the switch connector 122.

According to various embodiments, the switch assembly 140 may include alignment structures (for example see 580 in FIG. 5C) for aligning the switch assembly 140 to the switch connector 122 during assembling. According to various embodiments, the alignment structures may serve as a guide for bringing the switch assembly 140 and the switch connector 122 into alignment such that the first catch unit 152 and the second catch unit 154 may be aligned to coact for pulling the switch assembly 140 and the switch connector 122 together, and the plurality of electrical terminals 124 of the switch connector 122 and the plurality of contact elements 144 of the switch assembly 140 may be aligned so as to engage with each other when the switch assembly 140 and the switch connector 122 are magnetically coupled together. According to various embodiments, the alignment structures of the switch assembly 140 may include two or more alignment pins for aligning with corresponding recesses in the switch connector 122. According to various embodiments, the alignment structures of the switch assembly 140 may include enclosure wall structures (for example see 580 in FIG. 5C) for surrounding the switch connector 122.

Figure 2:
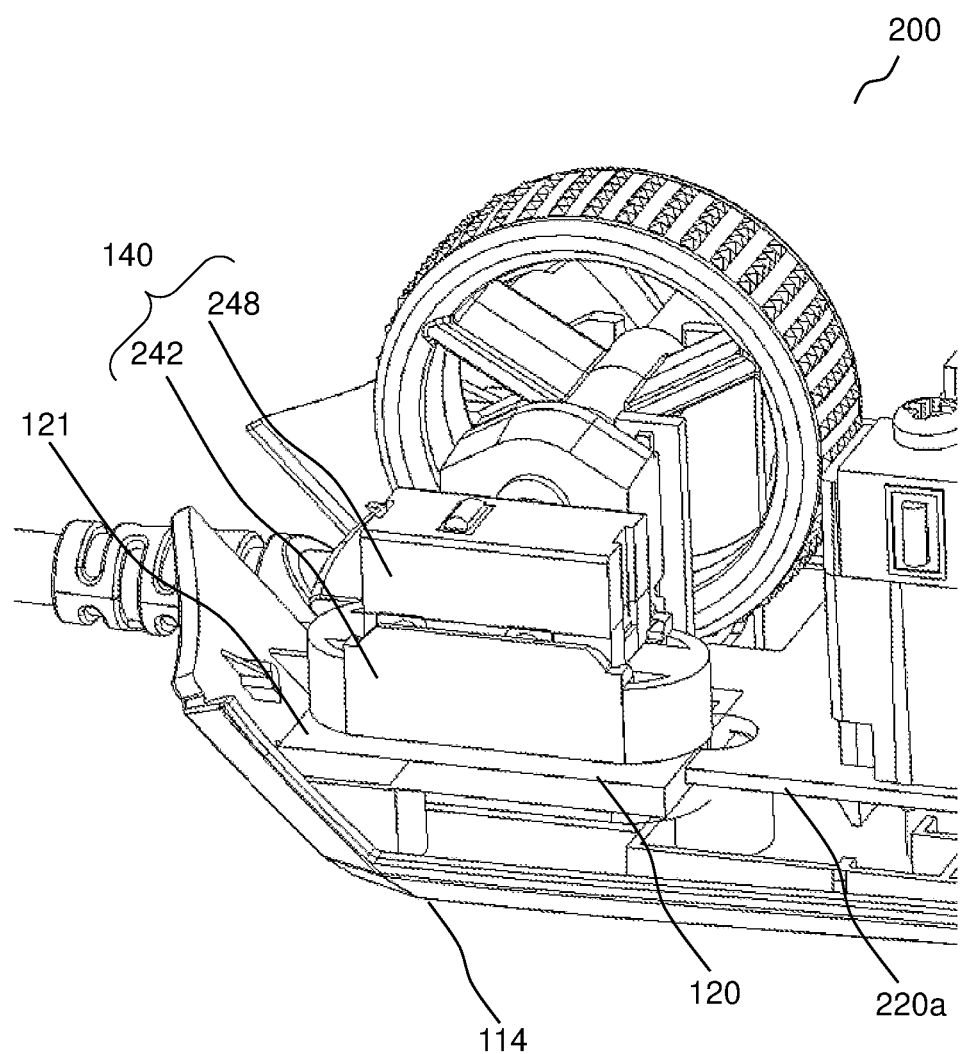
FIG. 2 shows a front portion of a computer mouse, as an example of the input device, with a cover portion of a housing of the computer mouse removed according to various embodiments.

FIG. 2 shows a front portion of a computer mouse 200, as an example of the input device, with the cover portion 112 of the housing 110 removed according to various embodiments. According to various embodiments, the computer mouse 200 is provided to illustrate an example implementation of the computer mouse 100 of FIG. 1A and FIG. 1B. Accordingly, the computer mouse 200 includes all the features and limitations of the computer mouse 100 of FIG. 1A and FIG. 1B and is described in the following with the same reference characters referring to the same/common parts throughout.

According to various embodiments, the computer mouse 200, as an example of the input device, may include the circuit board 120 having the planar surface 121. According to various embodiments, the computer mouse 200, as an example of the input device, may include the switch connector 122 (see for example FIG. 3A, and FIG. 4A) fixedly mounted to the circuit board 120. The computer mouse 200, as an example of the input device, may include the switch assembly 140 magnetically coupled to the switch connector 122 in a removable manner. As shown in FIG. 2 with reference to FIG. 3A and FIG. 4A, the switch assembly 140 may be stacked onto the switch connector 122 in a direction perpendicular to the planar surface 121 of the circuit board 120.

According to various embodiments, as shown in FIG. 2, the switch assembly 140 may include a switch adapter 242 to interface with the switch connector 122 and a switch 248 fitted to the switch adapter 242. According to various embodiments, the switch assembly 140 may be magnetically coupled to the switch connector 122 with the switch adapter 242 between the switch connector 122 and the switch 248 along the direction perpendicular to the planar surface 121 of the circuit board 120. Accordingly, when the switch assembly 140 is magnetically coupled to the switch connector 122, the arrangement of the switch assembly 140 and the switch connector 122 with respect to the direction perpendicular to the planar surface 121 of the circuit board 120 may be such that the switch connector 122 is at the bottom, the switch adapter 242 is in the middle and the switch 248 is at the top.

According to various embodiments, the switch assembly 140 may be a first switch assembly 140a (see for example FIG. 3A) or a second switch assembly 140b (see for example FIG. 4A). According to various embodiments, the first switch assembly 140a may differ from the second switch assembly 140b in that the first switch assembly 140a may include a mechanical switch 248a and a first switch adapter 242a for the mechanical switch 248a, while the second switch assembly 140b may include an optical switch 248b and a second switch adapter 242b for the optical switch 248b. According to various embodiments, since the switch assembly 140 is magnetically coupled to the switch connector 122 of the circuit board 120 in a removable manner, the switch assembly 140 may be swappable or interchangeable between, at least, the first switch assembly 140a and the second switch assembly 140b. According to various embodiments, the plurality of electrical terminals 124 of the switch connector 122 may be configured or arranged in a manner so as to be capable of swapping or interchanging between the first switch assembly 140a and the second switch assembly 140b. Hence, the user may swap or interchange between the first switch assembly 140a and the second switch assembly 140b for connecting to the switch connector 122 of the circuit board 120 of the computer mouse 200 depending on the desired tactile click feel and usage requirements.

According to various embodiments, in FIG. 2, the circuit board 120 of the computer mouse 200 is illustrated as a separate board from a main circuit board 220a of the computer mouse 200. According to various embodiments, the circuit board 120, which may receive the switch assembly 140, may be separate from the main circuit board 220a of the computer mouse 200 or may also be integrated into the main circuit board as a single continuous monolithic circuit board. According to various embodiments, when the circuit board 120 and the main circuit board 220a are separated as illustrated in FIG. 2, the circuit board 120 and the main circuit board 220a may be connected via various connection methods including, but not limited to, a board-to-board (BTB or B2B) connector, a flat flex connector (FFC), or a spring and soldered wire connection. According to various embodiments, when the circuit board 120 and the main circuit board 220a are separated as illustrated in FIG. 2, the circuit board 120 may include fastener, including but not limited to, snap catches or at least one screw to hole the circuit board 120 to the base portion 114 of the housing 110.

FIG. 3A shows the computer mouse 200 of FIG. 2 with the first switch assembly 140a having the mechanical switch 248a, whereby a section of the circuit board 120 is cut away to show the switch connector 122 with the plurality of electrical terminals 124, according to various embodiments. According to various embodiments, the plurality of electrical terminals 124 may be directed perpendicularly away from the planar surface 121 of the circuit board 120. Accordingly, the switch assembly 140 may then be stacked or fitted onto the plurality of electrical terminals 124 of the switch connector 122 in the direction perpendicular to the planar surface 121 of the circuit board 120. According to various embodiments, when the plurality of electrical terminals 124 comprises pogo pins or spring-loaded pins, plunger portions of the pogo pins or the spring-loaded pins may be protruding away from the planar surface 121 of the circuit board 120 and the a spring-loading direction of the pogo pins or the spring-loaded pins may be perpendicular to the planar surface 121 of the circuit board 120. According to various embodiments, when the plurality of electrical terminals 124 comprises pins, the pins may be protruding perpendicularly away from the planar surface 121 of the circuit board 120. According to various embodiments, when the plurality of electrical terminals 123 comprises contact pads, the contact pads may be facing the direction perpendicularly away from the planar surface 121 of the circuit board 120.

Figure 3B:
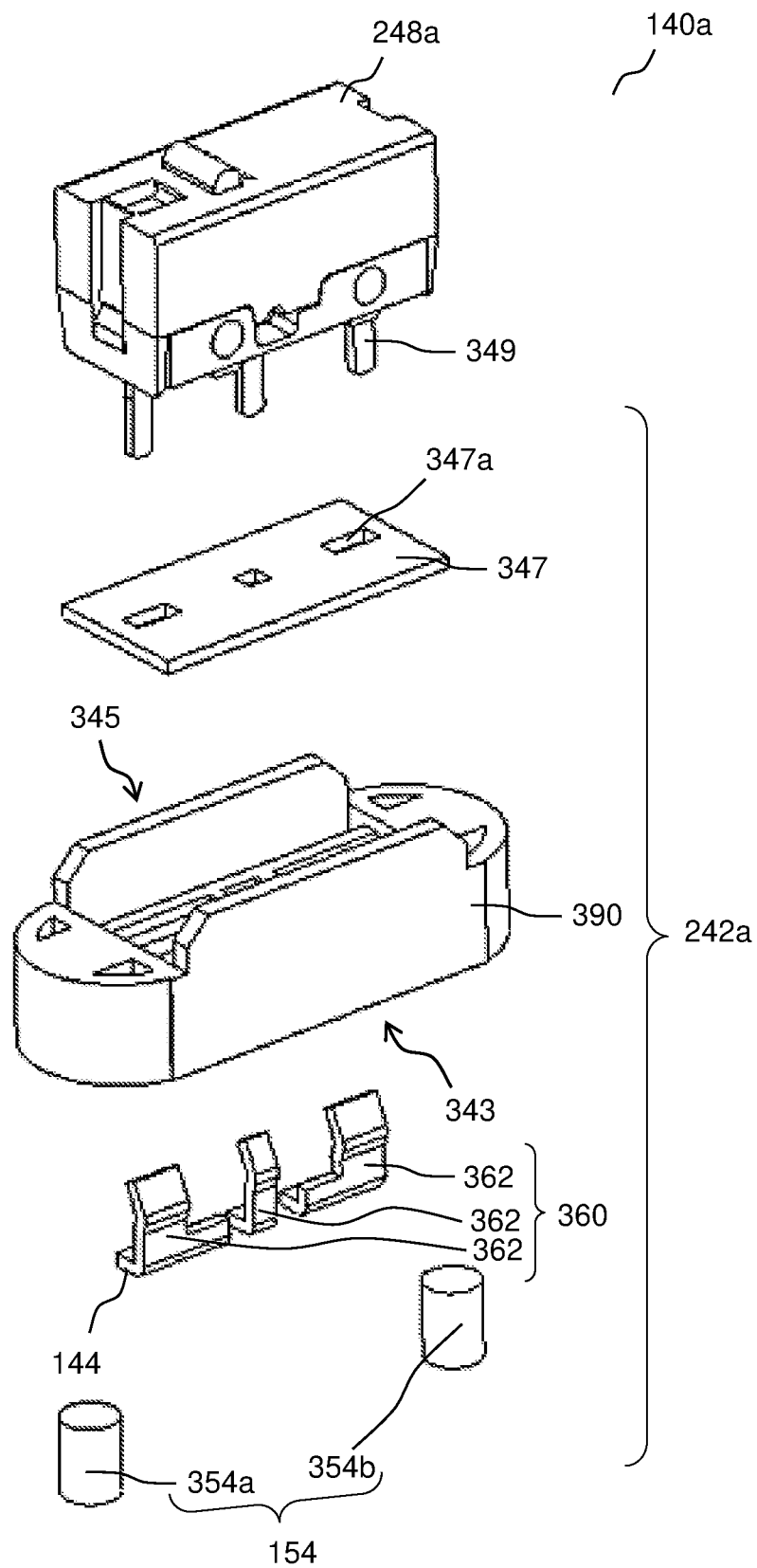
FIG. 3B shows an exploded view of the first switch assembly of FIG. 3A according to various embodiments.
Figure 3D:
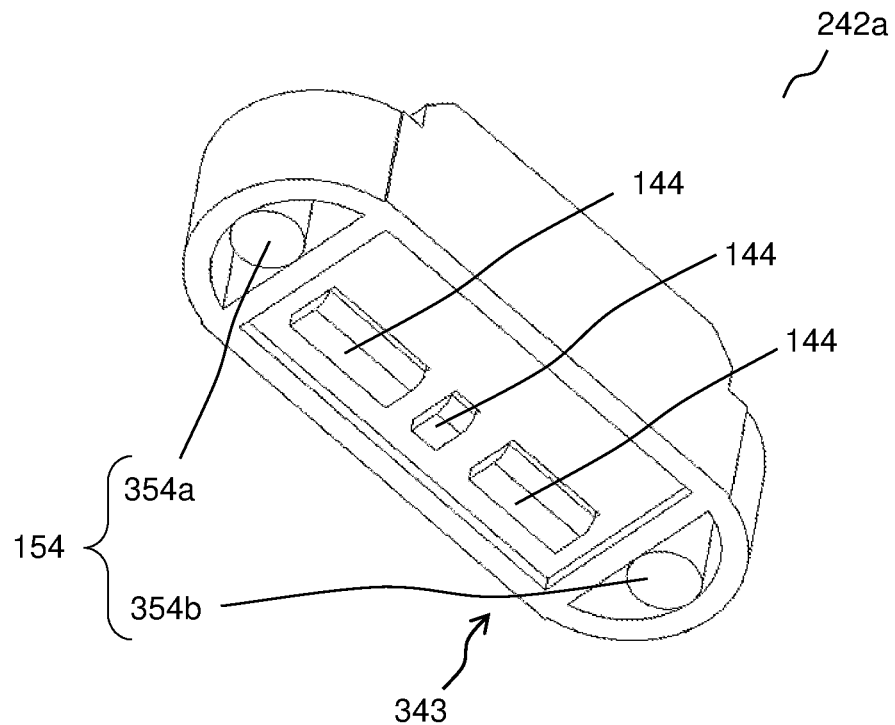
FIG. 3D shows a perspective bottom view of the first switch adapter of FIG. 3C according to various embodiments.

FIG. 3B shows an exploded view of the first switch assembly 140a of FIG. 3A according to various embodiments. FIG. 3C shows a perspective top view of the first switch adapter 242a of the first switch assembly 140a according to various embodiments. FIG. 3D shows a perspective bottom view of the first switch adapter 242a of the first switch assembly 140a according to various embodiments.

According to various embodiments, the first switch adapter 242a of the first switch assembly 140a may include a first adapter body 390. The first adapter body 390 may serve as a structure which holds the various parts of the first switch adapter 242a or which the various parts of the first switch adapter 242a may be fitted to. Accordingly, the first switch adapter 242a may be embodied by the first adapter body 390 which may give the first switch adapter 242a its physical form. According to various embodiments, the first switch adapter 242a of the first switch assembly 140a may include the plurality of contact elements 144 on a first side 343 of the first switch adapter 242a (for example see FIG. 3D). Hence, the plurality of contact elements 144 may be on the first side 343 of the first adapter body 390 of the first switch adapter 242a. According to various embodiments, the first side 343 of the first switch adapter 242a may be directed towards the switch connector 122 when the first switch assembly 140a is magnetically coupled to the switch connector 122.

According to various embodiments, the first switch adapter 242a of the first switch assembly 140a may include an arrangement of electrical elements 360 connected to the plurality of contact elements 144 of the first switch adapter 242a. According to various embodiments, in the first switch assembly 140a having the mechanical switch 248a, the arrangement of electrical elements 360 of the first switch adapter 242a may include spaced apart conductive strips 362. According to various embodiments, the conductive strips 362 may be spaced apart laterally. According to various embodiments, the conductive strips 362 may be fitted inside the first switch adapter 242a. Hence, the conductive strip 362 may be inserted into the first adapter body 390 of the first switch adapter 242a. According to various embodiments, when the first switch assembly 140a is magnetically coupled to the switch connector 122, the conductive strips 362 may be extending within the first switch adapter 242a in a perpendicular direction from the switch connector 122 to the mechanical switch 248a. Accordingly, the conductive strips 362 may be extending inside the first switch adapter 242a and perpendicularly from the first side 343 of the first switch adapter 242a towards a second side 345 of the first switch adapter 242a, wherein the first side 343 and the second side 345 are opposite sides of the first switch adapter 242a. For example, the first side 343 of the first switch adapter 242a may be a base of the first adapter body 390 and the second side 345 of the first switch adapter 242a may be a top of the first adapter body 390.

According to various embodiments, the first switch adapter 242a may include one conductive strip 362 for each of the plurality of contact elements 144. Accordingly, the first switch adapter 242a may include a corresponding number of the conductive strip 362 for the plurality of contact elements 144. For example, the first switch adapter 242a may include three contact element 144 and three conductive strips 362.

According to various embodiments, each of the plurality of contact elements 144 of the first switch adapter 242a may be a first end portion of each of the conductive strips 362 at the first side 343 of the first switch adapter 242a. The first end portion of each of the conductive strips 362 at the first side 343 of the first switch adapter 242a may be directed towards the switch connector 122 when the first switch assembly 140a is magnetically coupled to the switch connector 122. Accordingly, each of the plurality of contact elements 144 of the first switch adapter 242a and the corresponding conductive strip 362 may be a continuous monolithic structure or a single integral structure. According to various embodiments, a second end portion of each of the conductive strips 362 may be within the first switch adapter 242a and may be directed towards the second side 345 of the first switch adapter 242a. According to various embodiments, the plurality of contact elements 144 or the first end portions of the conductive strips 362 may be exposed through the first side 343 of the first switch adapter 242a.

According to various embodiments, the mechanical switch 248a may include a plurality of leads 349. According to various embodiments, each of the plurality of leads 349 of the mechanical switch 248a may include a length of wire or a pin. According to various embodiments, the plurality of leads 349 of the mechanical switch 248a may engage with the arrangement of electrical elements 360. Accordingly, the plurality of leads 349 of the mechanical switch 248a may be electrically connected to the plurality of contact elements 144 of the first switch adapter 242a via the arrangement of electrical elements 360 in the form of the conductive strips 362. According to various embodiments, the mechanical switch 248a may be fitted to the first switch adapter 242a with the plurality of leads 349 inserted through the second side 345 of the first switch adapter 242a. Accordingly, the plurality of leads 349 of the mechanical switch 248a may respectively engage or contact the second end portions of the conductive strips 362 so as to be respectively connected to the plurality of contact elements 144, which are the first end portions of the conductive strips 362.

According to various embodiments, the second end portion of each of the conductive strips 362 of the first switch adapter 242a may be bent at an angle with respect to a longitudinal direction of the conductive strip 362. Accordingly, with the conductive strips 362 bent at the second end portions thereof, the plurality of leads 349 of the mechanical switch 248a may engage or contact the second end portions of the conductive strips 362 when the mechanical switch 248a is fitted to the second side 345 of the first switch adapter 242a. According to various embodiments, bending the second end portions of the conductive strips 362 of the first switch adapter 242a may enhance the engagement or contact between the plurality of leads 349 of the mechanical switch 248a and the second end portions of the conductive strips 362.

According to various embodiments, the first switch adapter 242a may include an insulation shim plate 347. According to various embodiments, the insulation shim plate 347 may include a plurality of holes 347a. According to various embodiments, the insulation shim plate 347 may be at the second side 345 of the first switch adapter 242a. Accordingly, the insulation shim plate 347 may be at the side of the first switch adapter 242a opposite the plurality of contact elements 144 of the first switch adapter 242a. Hence, the insulation shim plate 347 may be at the second side 345 of the first adapter body 390 of the first switch adapter 242a. According to various embodiments, the insulation shim plate 347 may be oriented to be perpendicular to the direction extending from the first side 343 of the first switch adapter 242a to the second side 345 of the first switch adapter 242a. According to various embodiments, the plurality of holes 347a may correspond to the conductive strips 362 or the plurality of contact elements 144 of the first switch adapter 242a. Accordingly, a number of holes 347a in the insulation shim plate 347 may correspond to the number of conductive strips 362 or the number of contact elements 144. Further, the positions of the plurality of holes 347a may be respectively aligned to the conductive strips 362 or the plurality of contact elements 144.

According to various embodiments, the mechanical switch 248a may be fitted to the first switch adapter 242a in a manner so as to be abutting the insulation shim plate 347 at the second side 345 of the first switch adapter 242a and with the plurality of leads 349 of the mechanical switch 248a respectively inserted through the plurality of holes 347a of the insulation shim plate 347 to respectively engage with the conductive strips 362 inside the first switch adapter 242a. Accordingly, the mechanical switch 248 may be fitted to the second side of the first switch adapter 242a.

According to various embodiments, the first switch adapter 242a may include the second catch unit 154 of the magnetic catch arrangement 150. Accordingly, the second catch unit 154 of the magnetic catch arrangement 150 may be coupled to the first switch adapter 242a. Hence, the first switch assembly 140a may be magnetically coupled to the switch connector 122 of the circuit board 120 via the second catch unit 154 at the first switch adapter 242a. According to various embodiments, the second catch unit 154 may be at the first side 343 of the first switch adapter 242a such that first switch assembly 140a may be magnetically coupled to the switch connector 122 of the circuit board 120 with the first side 343 of the first switch adapter 242a directed towards the switch connector 122 of the circuit board 120. Accordingly, the second catch unit 154 of the magnetic catch arrangement 150 may be coupled to the first side 343 of the first adapter body 390 of the first switch adapter 242a.

According to various embodiments, the first adapter body 390 of the first switch adapter 242a may be of an elongated shape, including, but not limited to, a rectangular shape, an oblong shape, an oval shape, a flat oval shape, or a racecourse shape. According to various embodiments, the plurality of contact elements 144 of the first switch adapter 242a may be aligned longitudinally at the first side 343 of the first switch adapter 242a. According to various embodiments, the second catch unit 154 may include two catch elements 354a, 354b. The two catch elements 354a, 354b may be respectively disposed or located at two longitudinal ends of the first side 343 of the first switch adapter 242a.

According to various embodiments, the first catch unit 152 of the magnetic catch arrangement 150 may be at the circuit board 120. According to various embodiments, when the second catch unit 154 includes the two catch elements 354a, 354b, the first catch unit 152 may include two corresponding catch elements 352a, 352b. According to various embodiments, when the plurality of contact elements 144 of the first switch adapter 242a is lined in a single row, the plurality of electrical terminals 124 of the switch connector 122 of the circuit board 120 may also be lined to correspond to the plurality of contact elements 144 of the first switch adapter 242a. Accordingly, the two corresponding catch elements 352a, 352b of the first catch unit 152 may be aligned to the plurality of electrical terminals 124 of the switch connector 122. For example, accordingly to various embodiments, the two corresponding catch elements 352a, 352b of the first catch unit 152 may be lined respectively at two ends of the row of plurality of electrical terminals 124 of the switch connector 122. According to various embodiments, the two corresponding catch elements 352a, 352b of the first catch unit 152 may be placed in a catch housing 392 underneath the circuit board 120.

According to various embodiments, the catch housing 392 may be extending perpendicularly from base portion 114 of the housing 110 in an upward direction towards the circuit board 120. Accordingly, the catch housing 392 may be protruding upright from the base portion 114 of the housing 110. According to various embodiments, the catch housing 392 may be configured such that, when the two corresponding catch elements 352a, 352b of the first catch unit 152 are placed in the catch housing 392, the two corresponding catch elements 352a, 352b of the first catch unit 152 may be abutting the underneath of the circuit board 120 so as to be located at the circuit board 120. Hence, the two corresponding catch elements 352a, 352b of the first catch unit 152 may be held by the catch housing 392 in a manner such that the two corresponding catch elements 352a, 352b of the first catch unit 152 may be located underneath the circuit board 120.

According to various embodiments, as an example, the plurality of electrical terminals 124 in the form of pogo pins or spring-loaded pins may also be held by the catch housing 392. Accordingly, the pogo pins or spring-loaded pins may be extending upright from the catch housing 392 and penetrate through the circuit board 120 so as to be protruding perpendicularly away from the planar surface 121 of the circuit board 120. As shown in FIG. 3A, there may be three electrical terminals 124. According to various embodiments, the plurality of electrical terminals 124 may include two or three or four or five or six or more electrical terminals 124.

Figure 4B:
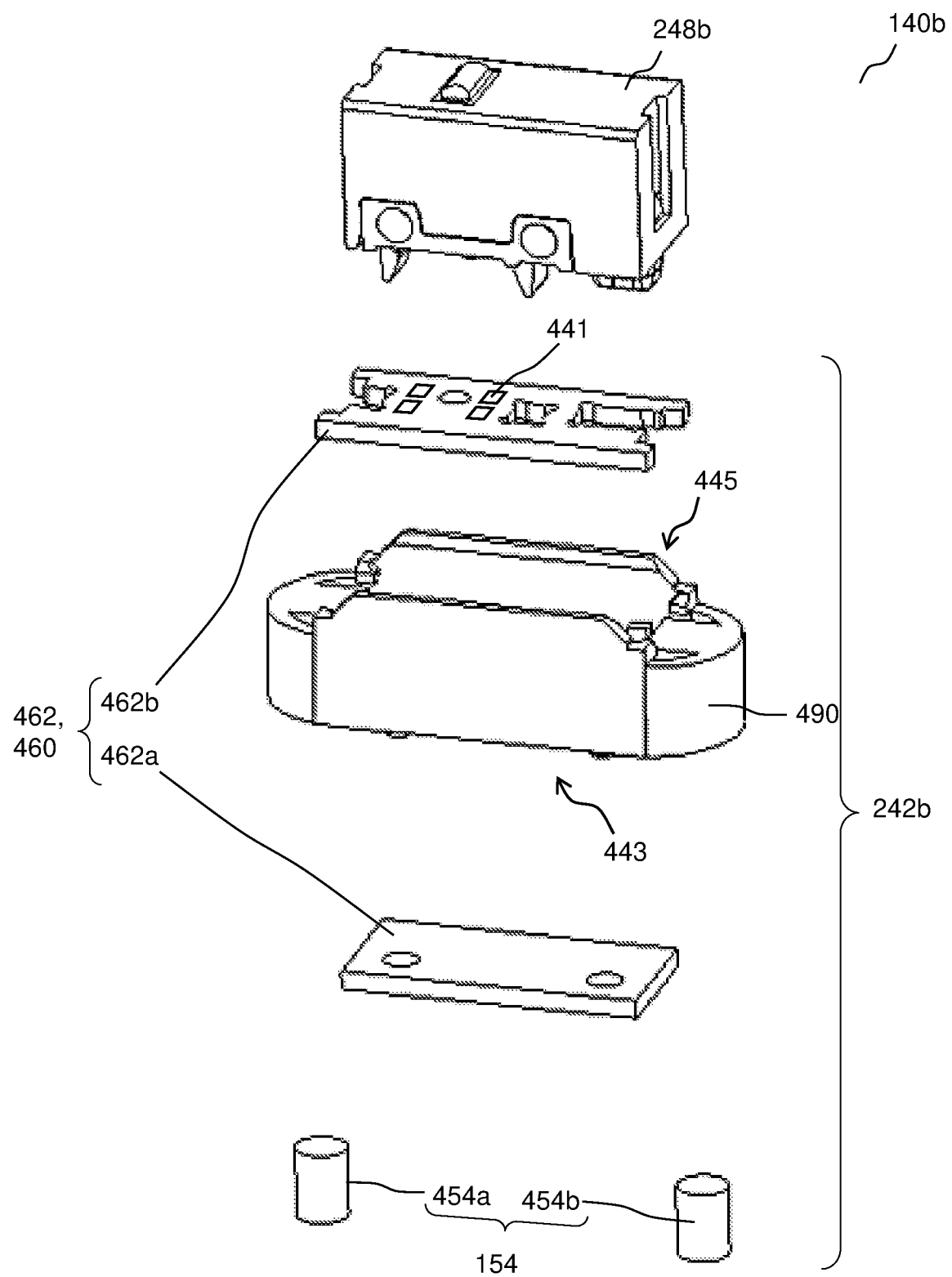
FIG. 4B shows an exploded view of the second switch assembly of FIG. 4A according to various embodiments.
Figure 4C:
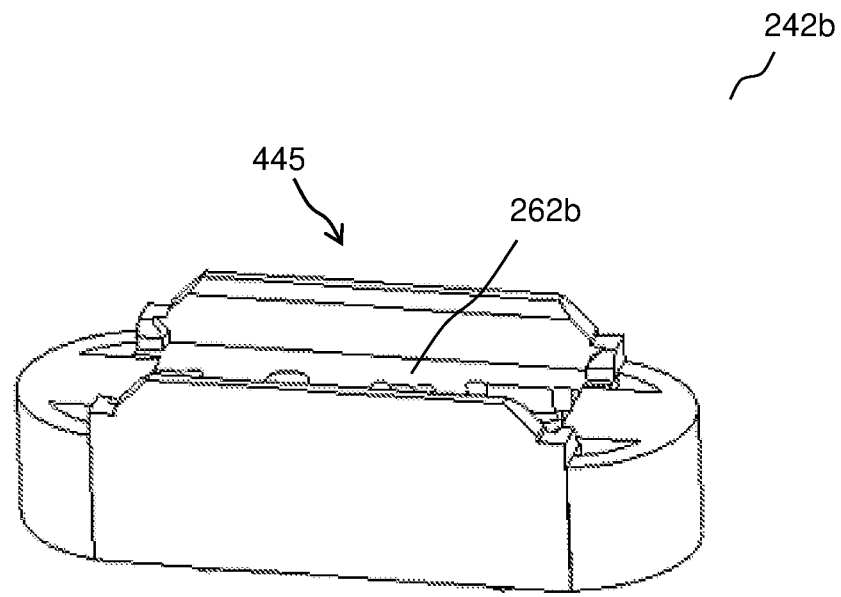
FIG. 4C shows a perspective top view of a second switch adapter of the second switch assembly of FIG. 4B according to various embodiments.
Figure 4D:
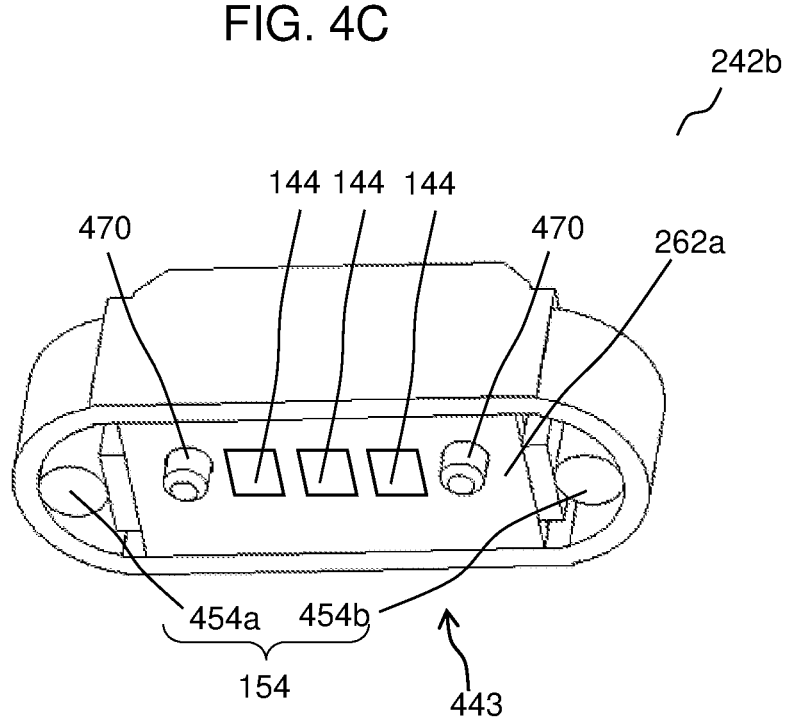
FIG. 4D shows a perspective bottom view of the second switch adapter of FIG. 4C according to various embodiments.

FIG. 4A shows the computer mouse 200 of FIG. 2 with the second switch assembly 140b having the optical switch 248b, whereby a section of the circuit board 120 is cut away to show the switch connector 122 with the plurality of electrical terminals 124, according to various embodiments. FIG. 4B shows an exploded view of the second switch assembly 140b of FIG. 4A according to various embodiments. FIG. 4C shows a perspective top view of the second switch adapter 242b of the second switch assembly 140b according to various embodiments. FIG. 4D shows a perspective bottom view of the second switch adapter 242b of the second switch assembly 140b according to various embodiments.

According to various embodiments, the second switch adapter 242b of the second switch assembly 140b may, similar to the first switch adapter 242a of the first switch assembly 140a of FIG. 3A to FIG. 3D, include a second adapter body 490. The second adapter body 490 may serve as a structure which holds the various parts of the second switch adapter 242b or which the various parts of the second switch adapter 242b may be fitted to. Accordingly, the second switch adapter 242b may be embodied by the second adapter body 490 which may give the second switch adapter 242b its physical form. According to various embodiments, the second switch adapter 242b of the second switch assembly 140b may, similar to the first switch adapter 242a of the first switch assembly 140a of FIG. 3A to FIG. 3D, include the plurality of contact elements 144 on a first side 443 of the second switch adapter 242b (for example see FIG. 4D).

Hence, the plurality of contact elements 144 may be on the first side 443 of the second adapter body 490 of the second switch adapter 242*b*. According to various embodiments, the first side 443 of the second switch adapter 242*b* may be directed towards the switch connector 122 when the second switch assembly 140*b* is magnetically coupled to the switch connector 122.

According to various embodiments, the second switch adapter 242*b* of the second switch assembly 240*b* may include an arrangement of electrical elements 460 connected to the plurality of contact elements 144 of the second switch adapter 242*b*. According to various embodiments, in the second switch assembly 240*b* having the optical switch 248*b*, the arrangement of electrical elements 460 of the second switch adapter 242*b* may include an intervening circuitry 462 disposed in the second switch adapter 242*b*. According to various embodiments, the intervening circuitry 462 may include, but not limited to, a circuit board, a circuit panel, or a printed circuit board.

According to various embodiments, the intervening circuitry 462 may include the plurality of contact elements 144 of the second switch adapter 242*b*. Accordingly, the plurality of contact elements 144 of the second switch adapter 242*b* may be on the circuit board, the circuit panel, or the printed circuit board. According to various embodiments, the intervening circuitry 462 may also include one or more connection points 441 for connecting with the optical switch 248*b*. Accordingly, the one or more connection points 441 of the second switch adapter 242*b* may be on the circuit board, the circuit panel, or the printed circuit board. Further, the optical switch 248*b* may be connected to the intervening circuitry 462 of the second switch assembly 240*b* via the one or more connection points 441. According to various embodiments, the plurality of contact elements 144 of the intervening circuitry 462 may be electrically connected to the one or more connection points 441 of the intervening circuitry 462. Accordingly, when the optical switch 248*b* is fitted to the second switch adapter 242*b*, the leads of the optical switch 248*b* may be engaged to the one or more connection points 441 of the second switch adapter 242*b* which may then electrically connect the plurality of leads of the optical switch 248*b* to the plurality of contact elements 144 of the second switch adapter 242*b*.

According to various embodiments, the intervening circuitry 462 may include an infrared (IR) component and/or a photothermal radiometry (PTR) component for the optical switch 248*b*. According to various other embodiments, the optical switch 248*b* may inbuilt with the infrared (IR) component and/or the photothermal radiometry (PTR) component.

According to various embodiments, the intervening circuitry 462 may include a printed circuit board assembly (PCBA). According to various embodiments, the printed circuit board assembly may include a first printed circuit board 462*a* and a second printed circuit board 462*b* in a dual layer arrangement. Accordingly, the first printed circuit board 462*a* and the second printed circuit board 462*b* may be parallel to each other. The first printed circuit board 462*a* may be at the first side 443 of the second adapter body 490 of the second switch adapter 242*b* and the second printed circuit board may be at a second side 445 of the second adapter body 490 of the second switch adapter 242*b*. The first side 443 and the second side 445 may be opposite sides of the second switch adapter 242*b*. For example, the first side 443 of the second switch adapter 242*b* may be a base of the second adapter body 490 and the second side 445 of the second switch adapter 242*b* may be a top of the second adapter body 490.

According to various embodiments, the first printed circuit board 462*a* and the second printed circuit board 462*b* may be interconnected to each other. Accordingly, the first printed circuit board 462*a* and the second printed circuit board 462*b* may be electrically connected to one another. According to various embodiments, the first printed circuit board 462*a* may include the plurality of contact elements 144. Accordingly, the plurality of contact elements 144 may be contact pads on the first printed circuit board 462*a*. According to various embodiments, the second printed circuit board 462*a* may include the one or more connection points 441. Accordingly, the one or more connection points may be contact pads on the second printed circuit board 462*b*. According to various embodiments, the first printed circuit board 462*a* and the second printed circuit board 462*b* may be arranged in a manner such that the plurality of contact elements 144 and the one or more connection points 441 may be directed away from each other. Accordingly, the plurality of contact elements 144 and the one or more connection points 441 may be facing opposite directions away from each other.

According to various embodiments, the second switch adapter 242*b* may include one or more plastic pins 470 to hold apart the first printed circuit board 462*a* and the second printed circuit board 462*b*. According to various embodiments, the one or more plastic pins 470 may be inner parts of the second adapter body 490 of the second switch adapter 242*b*. According to various embodiments, each of the one or more plastic pins 470 may respectively hold the first printed circuit board 462*a* and the second printed circuit board 462*b* at different points along a length of the plastic pin. According to various embodiments, the include one or more plastic pins 470 may hold the first printed circuit board 462*a* at the first side 443 of the second switch adapter 242*b* and hold the second printed circuit board 462*b* at the second side 445 of the second switch adapter 242*b*.

According to various embodiments, the second switch adapter 242*b* may, similar to the first switch adapter 242*a*, include the second catch unit 154 of the magnetic catch arrangement 150. Accordingly, the second catch unit 154 of the magnetic catch arrangement 150 may be coupled to the second switch adapter 242*b*. Hence, the second switch assembly 140*b* may be magnetically coupled to the switch connector 122 of the circuit board 120 via the second catch unit 154 at the second switch adapter 242*b*. According to various embodiments, the second catch unit 154 may be at the first side 443 of the second switch adapter 242*b* such that second switch assembly 140*b* may be magnetically coupled to the switch connector 122 of the circuit board 120 with the first side 443 of the second switch adapter 242*b* directed towards the switch connector 122 of the circuit board 120. Accordingly, the second catch unit 154 of the magnetic catch arrangement 150 may be coupled to the first side 443 of the second adapter body 490 of the second switch adapter 242*b*.

According to various embodiments, the second switch adapter 242*b* may be of an elongated shape, including, but not limited to, a rectangular shape, an oblong shape, an oval shape, a flat oval shape, or a race-course shape. According to various embodiments, the plurality of contact elements 144 of the second switch adapter 242*b* may be aligned longitudinally. According to various embodiments, the second catch unit 154 may include two catch elements 454*a*, 454b. The two catch elements 454a, 454b may be respectively disposed or located at two longitudinal ends of the second switch adapter 242b.

According to various embodiments, when the second catch unit 154 includes the two catch elements 454a, 454b, the first catch unit 152 of the magnetic catch arrangement 150 at the circuit board 120 may include two corresponding catch elements 452a, 452b. According to various embodiments, when the plurality of contact elements 144 of the second switch adapter 242b is lined in a single row, the plurality of electrical terminals 124 of the switch connector 122 of the circuit board 120 may also be lined to correspond to the plurality of contact elements 144 of the second switch adapter 242b. Accordingly, the two corresponding catch elements 452a, 452b of the first catch unit 152 may be aligned to the plurality of electrical terminals 124 of the switch connector 122. For example, accordingly to various embodiments, the two corresponding catch elements 452a, 452b of the first catch unit 152 may be lined respectively at two ends of the row of plurality of electrical terminals 124 of the switch connector 122. According to various embodiments, the two corresponding catch elements 452a, 452b of the first catch unit 152 may be placed in a catch housing 492 underneath the circuit board 120.

According to various embodiments, the catch housing 492 may be extending perpendicularly from base portion 114 of the housing 110 in an upward direction towards the circuit board 120. Accordingly, the catch housing 492 may be protruding upright from the base portion 114 of the housing 110. According to various embodiments, the catch housing 492 may be configured such that, when the two corresponding catch elements 452a, 452b of the first catch unit 152 are placed in the catch housing 492, the two corresponding catch elements 452a, 452b of the first catch unit 152 may be abutting the underneath of the circuit board 120 so as to be located at the circuit board 120. Hence, the two corresponding catch elements 452a, 452b of the first catch unit 152 may be held by the catch housing 492 in a manner such that the two corresponding catch elements 452a, 452b of the first catch unit 152 may be located underneath the circuit board 120.

According to various embodiments, as an example, the plurality of electrical terminals 124 in the form of pogo pins or spring-loaded pins may also be held by the catch housing 492. Accordingly, the pogo pins or spring-loaded pins may be extending upright from the catch housing 492 and penetrate through the circuit board 120 so as to be protruding perpendicularly away from the planar surface 121 of the circuit board 120. As shown in FIG. 4A, there may be three electrical terminals 124. According to various embodiments, the plurality of electrical terminals 124 may include two or three or four or five or six or more electrical terminals 124.

Figure 5A:
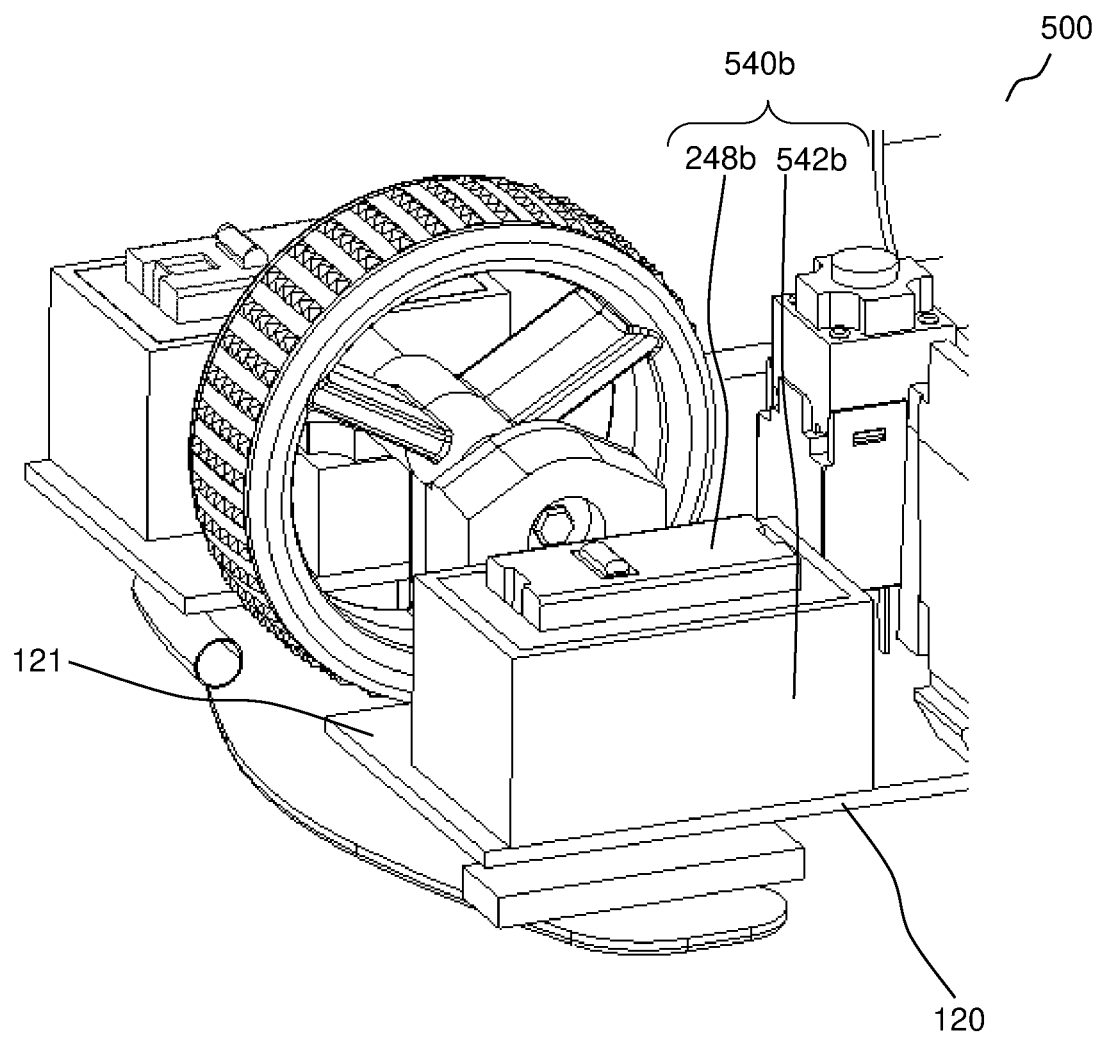
FIG. 5A shows a portion of an internal components of a computer mouse, as an example of the input device, without the housing according to various embodiments.
Figure 5B:
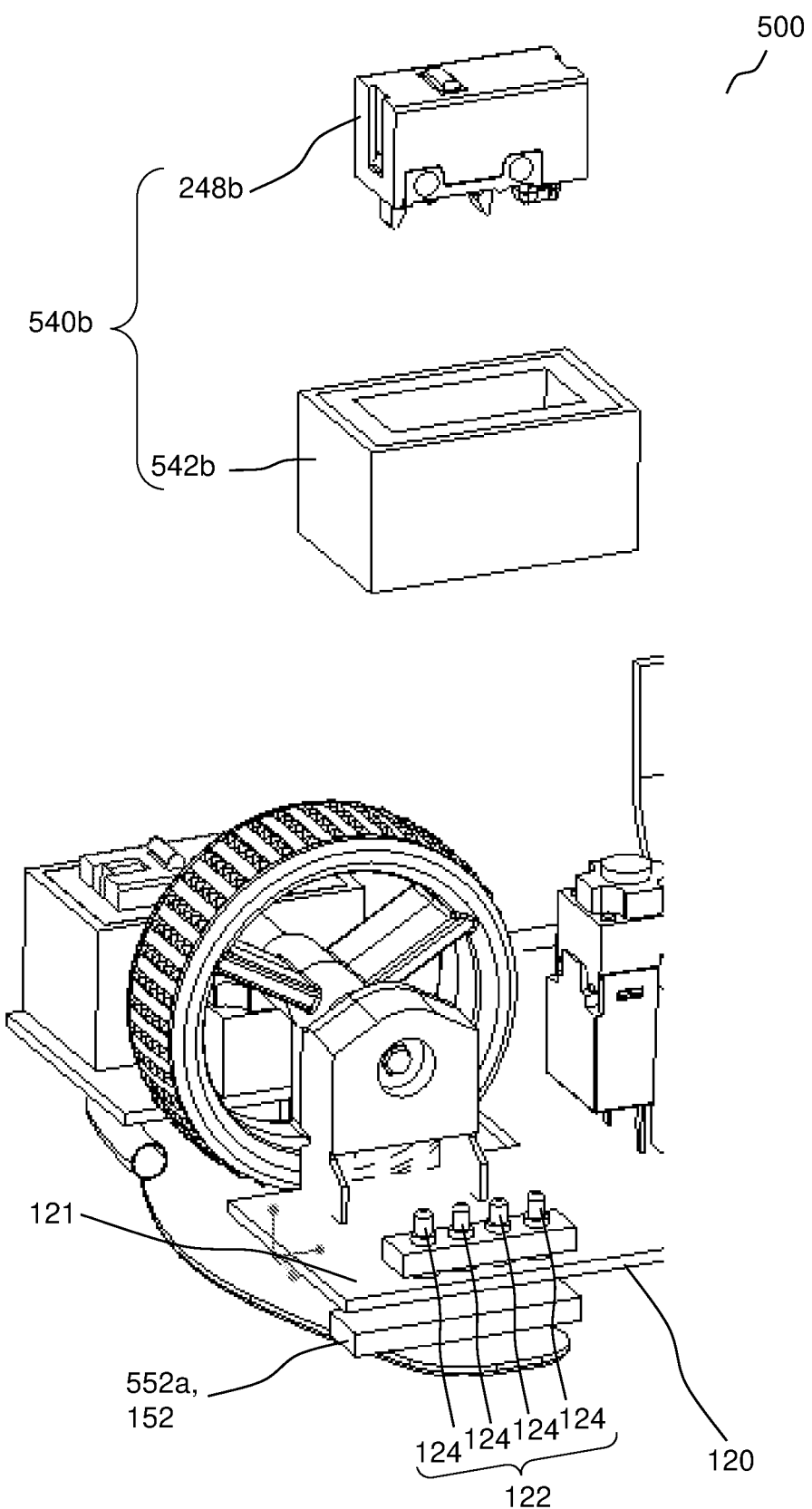
FIG. 5B shows the computer mouse of FIG. 5A with a variant of a second switch assembly having an optical switch for coupling to a switch connector with a plurality of electrical terminals at a circuit board of the computer mouse according to various embodiments.
Figure 5C:
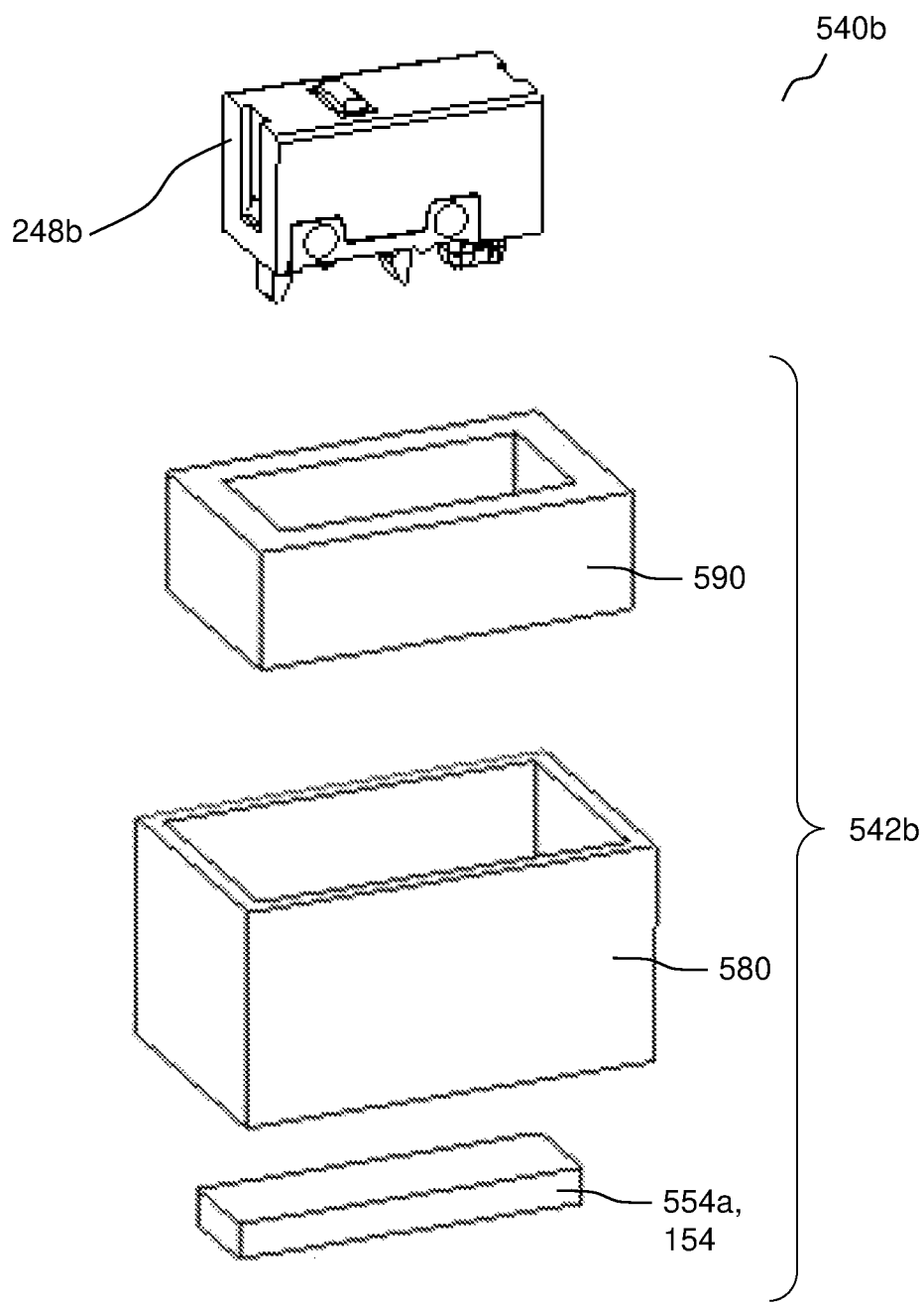
FIG. 5C shows an exploded view of the second switch assembly of FIG. 5B according to various embodiments.

FIG. 5A shows a portion of the internal components 104 of a computer mouse 500, as an example of the input device, without the housing 110 according to various embodiments. According to various embodiments, the computer mouse 500 is provided to illustrate an example implementation of the computer mouse 100 of FIG. 1A and FIG. 1B. Accordingly, the computer mouse 500 includes all the features and limitations of the computer mouse 100 of FIG. 1A and FIGS. 1B and 1s described in the following with the same reference characters referring to the same/common parts throughout. FIG. 5B shows the computer mouse 500 of FIG. 5A with a variant of a second switch assembly 540b having the optical switch 248b for coupling to the switch connector 122 with the plurality of electrical terminals 124 at the circuit board 120 according to various embodiments. FIG. 5C shows an exploded view of the second switch assembly 540b of FIG. 5B according to various embodiments.

According to various embodiments, the computer mouse 500, as an example of the input device, may include the circuit board 120 having the planar surface 121. According to various embodiments, the computer mouse 500, as an example of the input device, may include the switch connector 122 fixedly mounted to the circuit board 120. The computer mouse 500, as an example of the input device, may include the second switch assembly 540b magnetically coupled to the switch connector 122 in a removable manner. As shown in FIG. 5A and FIG. 5B, the second switch assembly 540b may be stacked onto the switch connector 122 in a direction perpendicular to the planar surface 121 of the circuit board 120.

According to various embodiments, as shown in FIG. 5A and FIG. 5B, the second switch assembly 540b may include a second switch adapter 542b to interface with the switch connector 122 and an optical switch 248b fitted to the second switch adapter 542b. According to various embodiments, the second switch assembly 540b may be magnetically coupled to the switch connector 122 with the second switch adapter 542b between the switch connector 122 and the optical switch 248b along the direction perpendicular to the planar surface 121 of the circuit board 120. Accordingly, when the second switch assembly 540b is magnetically coupled to the switch connector 122, the arrangement of the second switch assembly 540b and the switch connector 122 with respect to the direction perpendicular to the planar surface 121 of the circuit board 120 may be such that the switch connector 122 is at the bottom, the second switch adapter 542b is in the middle and the optical switch 248b is at the top.

According to various embodiments, since the second switch assembly 540b is magnetically coupled to the switch connector 122 of the circuit board 120 in a removable manner, the second switch assembly 540b may be swappable or interchangeable with a first switch assembly (not shown) in a manner similar to the first switch assembly 140a and second switch assembly 140b of FIG. 2 to FIG. 4D. According to various embodiments, the plurality of electrical terminals 124 of the switch connector 122 may be configured or arranged in a manner so as to be capable of swapping or interchanging between the first switch assembly and the second switch assembly 540b. Hence, the user may swap or interchange between the first switch assembly and the second switch assembly 540b for connecting to the switch connector 122 of the circuit board 120 of the computer mouse 500 depending on the desired tactile click feel and usage requirements.

According to various embodiments, the second switch adapter 542b of the second switch assembly 540b may differ from the second switch adapter 242b of the second switch assembly 240b of FIG. 4A to FIG. 4C in that the second switch adapter 542b of the second switch assembly 540b may include an enclosure 580 surrounding an adapter body 590 of the second switch adapter 542b of the second switch assembly 540b. The adapter body 590 may serve as a structure which holds the various parts of the second switch adapter 542b or which the various parts of the second switch adapter 542b may be fitted to. Accordingly, the second switch adapter 542b may be embodied by the adapter body 590 which may give the second switch adapter 542b its physical form. According to various embodiments, the adapter body 590 of the second switch adapter 542b may be fitted with or include the plurality of contact elements 144, the arrangement of electrical elements 460, and the one or more connection points 441 in a manner similar to that of the second switch adapter 242b of the second switch assembly 240b of FIG. 4A to FIG. 4C.

According to various embodiments, enclosure wall structures of the enclosure 580 of the second switch adapter 542b of the second switch assembly 540b may serve as the alignment structures. Accordingly, the enclosure 580 may serve as a guide for bringing the switch assembly 540b and the switch connector 122 into alignment such that the plurality of electrical terminals 124 of the switch connector 122 and the plurality of contact elements 144 of the switch assembly 540b may be aligned so as to engage with each other when the switch assembly 540b and the switch connector 122 are magnetically coupled together.

According to various embodiments, the second switch adapter 542b of the second switch assembly 540b may further differ from the second switch adapter 242b of the second switch assembly 240b of FIG. 4A to FIG. 4C in that the second catch unit 154 of the second switch adapter 542b of the second switch assembly 540b may include may include an elongated catch elements 554a. The elongated catch elements 554a may be disposed lengthwise or aligned longitudinally with respect to the second switch adapter 542b.

According to various embodiments, when the second catch unit 154 includes the elongated catch elements 554a, the first catch unit 152 of the magnetic catch arrangement 150 at the circuit board 120 may include a corresponding elongated catch elements 552a. According to various embodiments, the plurality of electrical terminals 124 of the switch connector 122 of the circuit board 120 may be lined in a row to correspond to the plurality of contact elements 144 of the second switch adapter 542b. Accordingly, the corresponding elongated catch elements 552a of the first catch unit 152 may be aligned lengthwise or parallel to the plurality of electrical terminals 124 of the switch connector 122. For example, accordingly to various embodiments, the corresponding elongated catch elements 552a of the first catch unit 152 may be lined underneath the circuit board 120 along the row of plurality of electrical terminals 124 of the switch connector 122.

Various embodiments have provided an input device or a computer mouse which allow a user to customize the mouse click feel of the mouse button based on usage requirements via swapping or interchanging the switch assembly. Various embodiments have also provided switch assemblies which the user may use to swap or interchange in the input device or the computer mouse.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An input device comprising:
    a circuit board;
    a switch connector fixedly mounted to the circuit board, the switch connector having a plurality of electrical terminals;
    a switch assembly magnetically coupled to the switch connector in a removable manner, the switch assembly comprising:
        a switch adapter to interface with the switch connector, the switch adapter having
        a plurality of contact elements in engagement with the plurality of electrical terminals of the switch connector, and
        an arrangement of electrical elements connected to the plurality of contact elements of the switch adapter, and
        a switch fitted to the switch adapter with a plurality of leads of the switch engaged to the arrangement of electrical elements so as to electrically connect the plurality of leads of the switch to the plurality of contact elements of the switch adapter,
    wherein the switch assembly is magnetically coupled to the switch connector with the switch adapter between the switch connector and the switch;
    and
    a magnetic catch arrangement to magnetically couple the switch assembly to the switch connector, the magnetic catch arrangement comprises a first catch unit coupled to the circuit board and a second catch unit coupled to the switch adapter, wherein the first catch unit and the second catch unit comprises a pair of coacting magnet elements or a coacting pair of a magnetic metal element and a magnet element such that the first catch unit and the second catch unit coact with each other to magnetically couple the switch assembly and the switch connector,
    wherein the switch is a mechanical switch or an optical switch,
    wherein, when the switch is the mechanical switch, the arrangement of electrical elements of the switch adapter comprises spaced apart conductive strips extending within the switch adapter in a perpendicular direction from the switch connector to the mechanical switch, wherein the switch adapter comprises an insulation shim plate with a plurality of holes, the insulation shim plate being on a side of the switch adapter opposite the plurality of contact elements of the switch adapter,
    wherein, when the switch is the optical switch, the arrangement of electrical elements of the switch adapter comprises an intervening circuitry disposed in the switch adapter, wherein the intervening circuitry comprises the plurality of contact elements of the switch adapter and one or more connection points to connect to the optical switch, wherein the intervening circuitry comprises a printed circuit board assembly having a first printed circuit board and a second printed circuit board in a dual layer arrangement and interconnected to each other.

2. The input device as claimed in claim 1,
    wherein, when the switch is the mechanical switch, each of the plurality of contact elements of the switch adapter is a first end portion of each of the conductive strips directed towards the switch connector, wherein each of the conductive strips is bent at a second end portion thereof so as to engage with a corresponding lead of the plurality of leads of the mechanical switch, and/or
    wherein, when the switch is the mechanical switch, the mechanical switch is fitted to the switch adapter in a manner so as to be abutting the insulation shim plate and with the plurality of leads of the mechanical switch respectively inserted through the plurality of holes of the insulation shim plate to respectively engage with the conductive strips.

3. The input device as claimed in claim 1
wherein, when the switch is the optical switch, the first printed circuit board has the plurality of contact elements and the second printed circuit board has the one or more connection points, wherein the first printed circuit board and the second printed circuit board are arranged in a manner such that the plurality of contact elements and the one or more connection points are directed away from each other,
wherein, when the switch is the optical switch, the switch adapter comprises one or more plastic pins to hold apart the first printed circuit board and the second printed circuit board,
wherein, when the switch is the optical switch, the switch assembly is magnetically coupled to the switch connector with the plurality of contact elements of the first printed circuit board of the switch adapter in contact with the plurality of electrical terminals of the switch connector, and the optical switch abutting the second printed circuit board of the switch adapter.

4. The input device as claimed in claim 1,
wherein the first catch unit comprises one or more catch elements and the second catch unit comprises one or more corresponding catch elements,
wherein the first catch unit comprises one elongated catch element coupled to the circuit board and the second catch unit comprise one corresponding elongated catch element coupled to the switch adapter, wherein the elongated catch element of the first catch unit of the circuit board is aligned to the corresponding elongated catch element of the second catch unit of the switch adapter in a manner so as to align the plurality of contact elements of the switch adapter to the plurality of electrical terminals of the switch connector when the elongated catch element of the circuit board and the corresponding elongated catch element of the switch adapter coact to magnetically couples the switch adapter and the switch connector, or
wherein the first catch unit comprises two or more catch elements coupled to the circuit board and the second catch unit comprises two or more corresponding catch elements coupled to the switch adapter, wherein the two or more catch elements of the first catch unit of the circuit board are lined with respect to the plurality of electrical terminals of the switch connector and the two or more corresponding catch elements of the second catch unit of the switch adapter are aligned to the plurality of contact elements of the switch adapter in a manner so as to align the plurality of contact elements of the switch adapter to the plurality of electrical terminals of the switch connector when the two or more catch elements of the first catch unit of the circuit board and the two or more corresponding catch elements of the second catch unit of the switch adapter coact to magnetically couples the switch adapter and the switch connector.

5. The input device as claimed in claim 1,
wherein the circuit board has a planar surface,
wherein the plurality of electrical terminals of the switch connector is directed perpendicularly away from the planar surface of the circuit board,
wherein the switch assembly is magnetically coupled to the switch connector in a manner so as to be removably stacked onto the switch connector in a direction perpendicular to the planar surface of the circuit board,
wherein the switch adapter of the switch assembly is between the switch connector and the switch of the switch assembly along the direction perpendicular to the planar surface of the circuit board.

6. A switch assembly for magnetically coupling to a switch connector fixedly mounted to a circuit board of an input device, the switch assembly comprising
a switch adapter to interface with the switch connector of the circuit board, the switch adapter having
a plurality of contact elements on a first side of the switch adapter for engaging with a plurality of electrical terminals of the switch connector of the circuit board, and
an arrangement of electrical elements connected to the plurality of contact elements of the switch adapter;
a switch fitted to the switch adapter with a plurality of leads of the switch engaged to the arrangement of electrical elements so as to electrically connect the plurality of leads of the switch to the plurality of contact elements of the switch adapter, wherein the switch is fitted to the switch adapter on a second side of the switch adapter opposite the first side of the switch adapter having the plurality of contact elements; and
a catch unit coupled to the switch adapter, the catch unit comprising a magnet element or a magnetic metal element to coact with a corresponding catch unit of the circuit board so as to magnetically couple the switch assembly to the switch connector via the switch adapter,
wherein the switch is a mechanical switch, wherein the arrangement of electrical elements of the switch adapter comprises spaced apart conductive strips extending within the switch adapter from the first side of the switch adapter towards the second side of the switch adapter,
wherein the switch adapter comprises an insulation shim plate with a plurality of holes, the insulation shim plate being on the second side of the switch adapter.

7. The switch assembly as claimed in claim 6,
wherein the catch unit comprises one elongated catch element coupled to the switch adapter, the one elongated catch element being aligned to the plurality of contact elements of the switch adapter in a manner so as to coact with a corresponding elongated catch element of the circuit board for magnetically coupling the switch adapter to the switch connector of the circuit board such that the plurality of contact elements of the switch adapter engages with the plurality of electrical terminals of the switch connector, or
wherein the catch unit comprises two or more catch elements coupled to the switch adapter, the two or more catch elements being aligned to the plurality of contact elements of the switch adapter in a manner so as to coact with two or more corresponding catch elements of the circuit board for magnetically coupling the switch adapter to the switch connector of the circuit board such that the plurality of contact elements of the switch adapter engages with the plurality of electrical terminals of the switch connector.

8. The switch assembly as claimed in claim 6, wherein the mechanical switch is fitted to the switch adapter in a manner so as to be abutting the insulation shim plate and with the plurality of leads of the mechanical switch respectively inserted through the plurality of holes of the insulation shim plate to respectively engage with the conductive strips.

9. The switch assembly as claimed in claim 6, wherein each of the plurality of contact elements of the switch adapter is a first end portion of each of the conductive strips at the first side of the switch adapter.

10. The switch assembly as claimed in claim 9, wherein each of the conductive strips is bent at a second end portion thereof so as to engage with a corresponding lead of the plurality of leads of the mechanical switch.

11. A switch assembly for magnetically coupling to a switch connector fixedly mounted to a circuit board of an input device, the switch assembly comprising
   a switch adapter to interface with the switch connector of the circuit board, the switch adapter having
      a plurality of contact elements on a first side of the switch adapter for engaging with a plurality of electrical terminals of the switch connector of the circuit board, and
      an arrangement of electrical elements connected to the plurality of contact elements of the switch adapter;
   a switch fitted to the switch adapter with a plurality of leads of the switch engaged to the arrangement of electrical elements so as to electrically connect the plurality of leads of the switch to the plurality of contact elements of the switch adapter, wherein the switch is fitted to the switch adapter on a second side of the switch adapter opposite the first side of the switch adapter having the plurality of contact elements; and
   a catch unit coupled to the switch adapter, the catch unit comprising a magnet element or a magnetic metal element to coact with a corresponding catch unit of the circuit board so as to magnetically couple the switch assembly to the switch connector via the switch adapter,
   wherein the switch is an optical switch, wherein the arrangement of electrical elements of the switch adapter comprises an intervening circuitry disposed in the switch adapter, wherein the intervening circuitry comprises the plurality of contact elements of the switch adapter and one or more connection points to connect to the optical switch,
   wherein the intervening circuitry comprises a printed circuit board assembly having a first printed circuit board and a second printed circuit board in a dual layer arrangement and interconnected to each other.

12. The switch assembly as claimed in claim 11,
   wherein the catch unit comprises one elongated catch element coupled to the switch adapter, the one elongated catch element being aligned to the plurality of contact elements of the switch adapter in a manner so as to coact with a corresponding elongated catch element of the circuit board for magnetically coupling the switch adapter to the switch connector of the circuit board such that the plurality of contact elements of the switch adapter engages with the plurality of electrical terminals of the switch connector, or
   wherein the catch unit comprises two or more catch elements coupled to the switch adapter, the two or more catch elements being aligned to the plurality of contact elements of the switch adapter in a manner so as to coact with two or more corresponding catch elements of the circuit board for magnetically coupling the switch adapter to the switch connector of the circuit board such that the plurality of contact elements of the switch adapter engages with the plurality of electrical terminals of the switch connector.

13. The switch assembly as claimed in claim 11, wherein the first printed circuit board has the plurality of contact elements and the second circuit board has the one or more connection points, wherein the first printed circuit board is at the first side of the switch adapter and the second printed circuit board is at the second side of the switch adapter.

14. The switch assembly as claimed in claim 13, wherein the switch adapter comprises plastic pins to hold apart the first printed circuit board and the second printed circuit board.

15. The switch assembly as claimed in claim 13, wherein the optical switch is fitted to the switch adapter with the optical switch abutting the second printed circuit board of the switch adapter.

\* \* \* \* \*